(12) United States Patent
Kondo et al.

(10) Patent No.: US 10,986,280 B2
(45) Date of Patent: Apr. 20, 2021

(54) ELECTRONIC APPARATUS

(71) Applicant: CANON KABUSHIKI KAISHA, Tokyo (JP)

(72) Inventors: Emi Kondo, Tokyo (JP); Tatsuya Nishiguchi, Kawasaki (JP); Tomoaki Takahashi, Sagamihara (JP); Yosuke Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/228,970

(22) Filed: Dec. 21, 2018

(65) Prior Publication Data

US 2019/0199901 A1  Jun. 27, 2019

(30) Foreign Application Priority Data

Dec. 27, 2017 (JP) .............................. JP2017-251115
Dec. 27, 2017 (JP) .............................. JP2017-251132
(Continued)

(51) Int. Cl.
*H04N 5/235* (2006.01)
*H04N 5/93* (2006.01)
(Continued)

(52) U.S. Cl.
CPC ............. *H04N 5/2351* (2013.01); *G06F 3/14* (2013.01); *G06T 5/007* (2013.01); *H04N 5/2355* (2013.01);
(Continued)

(58) Field of Classification Search
CPC .......... G06F 3/14; H04N 19/90; H04N 19/98; H04N 5/2351; H04N 5/2355; H04N 5/355;
(Continued)

(56) References Cited

U.S. PATENT DOCUMENTS 5,418,565 A * 5/1995 Smith ................... G06T 3/4015
348/231.9
5,774,126 A * 6/1998 Chatterjee ................ G09G 5/02
345/605
(Continued)

FOREIGN PATENT DOCUMENTS

CN   103843058 A   6/2014
CN   107087220 A   8/2017
(Continued)

OTHER PUBLICATIONS

The above document was cited in a European Search Report dated Jul. 9, 2019, which is enclosed, that issued in the corresponding European Patent Application No. 18215099.5.
(Continued)

*Primary Examiner* — Chiawei Chen
(74) *Attorney, Agent, or Firm* — Cowan, Liebowitz & Latman, P.C.

(57) ABSTRACT

An electronic apparatus includes: a connecting unit (connector) that connects with an external apparatus; a setting unit sets a connection mode to any of a plurality of connection modes, including a first connection mode in which an image having a gradation resolution which is not higher than a first gradation resolution is outputted, and a second connection mode in which an image having a gradation resolution which is higher than the first gradation resolution is outputted; and a control unit controls so that in a case where the connection is in the second connection mode and an instruction to switch a first screen including a captured image to a second screen not including a captured image is received, the set connection mode is switched from the second connection mode to the first connection mode, and the second screen is outputted from the connecting unit.

20 Claims, 18 Drawing Sheets

(30) Foreign Application Priority Data

| Dec. 27, 2017 | (JP) | JP2017-251161 |
|---|---|---|
| Dec. 27, 2017 | (JP) | JP2017-251259 |
| Dec. 27, 2017 | (JP) | JP2017-252110 |
| Nov. 12, 2018 | (JP) | JP2018-212167 |

(51) Int. Cl.
| *H04N 5/355* | (2011.01) |
|---|---|
| *H04N 19/90* | (2014.01) |
| *G06F 3/14* | (2006.01) |
| *H04N 19/98* | (2014.01) |
| *G06T 5/00* | (2006.01) |

(52) U.S. Cl.
CPC .............. *H04N 5/355* (2013.01); *H04N 5/93* (2013.01); *H04N 19/90* (2014.11); *H04N 19/98* (2014.11); *G06T 2207/20208* (2013.01); *G09G 2340/02* (2013.01); *G09G 2340/0428* (2013.01); *G09G 2340/06* (2013.01)

(58) Field of Classification Search
CPC .... H04N 5/93; H04N 13/189; H04N 21/2662; H04N 9/825; H04N 13/324; H04N 2201/32; H04N 2201/3201; H04N 2201/3273; H04N 2201/333; H04N 2201/33307; H04N 2201/33314; H04N 2201/33328; H04N 21/816; H04N 1/32518; H04N 1/32529; H04N 1/32534; H04N 1/32512; G09G 2340/02; G09G 2340/0428; G09G 2340/06; G06T 2207/20208; G06T 5/007

See application file for complete search history.

(56) References Cited

U.S. PATENT DOCUMENTS

| 6,812,934 | B1* | 11/2004 | Yoshida | H04N 9/641 |
|---|---|---|---|---|
| | | | | 345/636 |
| 2003/0201990 | A1* | 10/2003 | Aldrich | G09G 5/04 |
| | | | | 345/211 |
| 2004/0105024 | A1* | 6/2004 | Takahashi | H04N 1/00291 |
| | | | | 348/333.01 |
| 2006/0161042 | A1* | 7/2006 | Kobayashi | A61B 1/00101 |
| | | | | 600/109 |
| 2007/0019111 | A1* | 1/2007 | Won | H04N 21/4316 |
| | | | | 348/569 |
| 2008/0309811 | A1* | 12/2008 | Fujinawa | H04N 5/23293 |
| | | | | 348/333.01 |
| 2009/0086089 | A1* | 4/2009 | Matsui | H04N 7/015 |
| | | | | 348/441 |
| 2012/0159032 | A1* | 6/2012 | Onuki | G06F 3/14 |
| | | | | 710/305 |
| 2017/0105042 | A1* | 4/2017 | Toma | H04N 7/08 |
| 2017/0221524 | A1* | 8/2017 | Uchimura | G11B 27/11 |
| 2017/0365207 | A1* | 12/2017 | Maaranen | G09G 3/2096 |
| 2018/0082661 | A1* | 3/2018 | Kang | G09G 3/36 |
| 2018/0330674 | A1* | 11/2018 | Baar | G06T 5/009 |
| 2019/0058855 | A1* | 2/2019 | Uchimura | G09G 5/026 |

FOREIGN PATENT DOCUMENTS

| CN | 107154059 A | 9/2017 |
|---|---|---|
| CN | 107241588 A | 10/2017 |
| CN | 107277399 A | 10/2017 |
| EP | 3163890 A1 | 5/2017 |
| JP | 2002-325198 A | 11/2002 |
| JP | 2003-110563 A | 4/2003 |
| JP | 2005-167809 A | 6/2005 |
| JP | 2006-033089 A | 2/2006 |
| JP | 2010/268332 A | 11/2010 |
| JP | 2017068207 A * | 4/2017 |
| WO | 2017033811 A1 | 3/2017 |
| WO | 2017-145722 A1 | 8/2017 |

OTHER PUBLICATIONS

Kevin Murnane, "Quick Tip: Hoe to Enable HDR on an LG TV", http://www.forbes.com/sites/kevinmurnane/2017/11/30/quick-tip-how-to-enable-hdr-on-an-lg-tv, May 27, 2019, pp. 1-2.

The above patent document was cited in a European Search Report dated Jun. 5, 2019, which is enclosed, that issued in the corresponding European Patent Application No. 18215098.7.

The above documents were cited in a Oct. 27, 2020 Chinese Office Action, which is enclosed with an English Translation, that issued in Chinese Patent Application No. 201811574812.1.

* cited by examiner

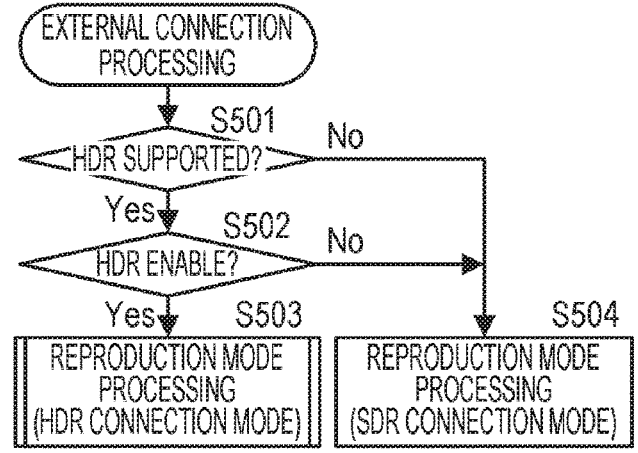
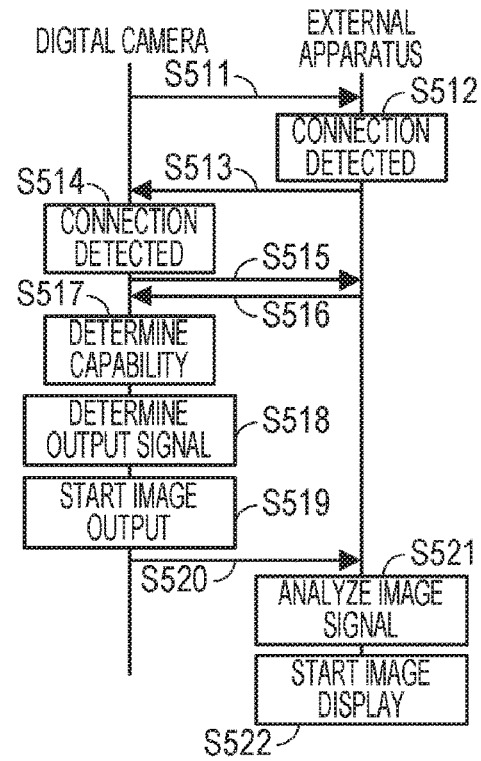
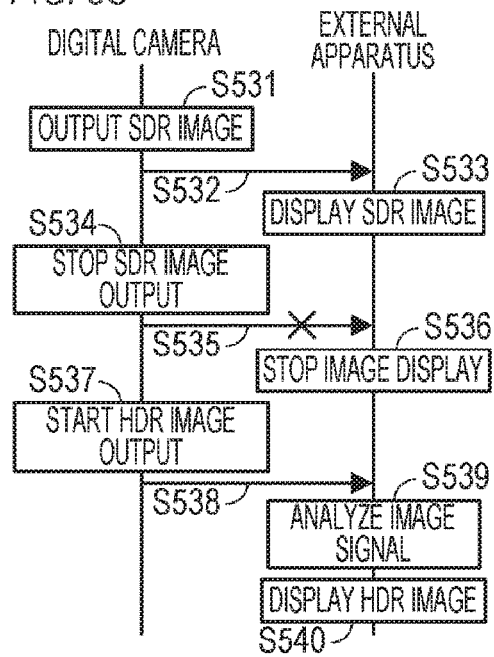
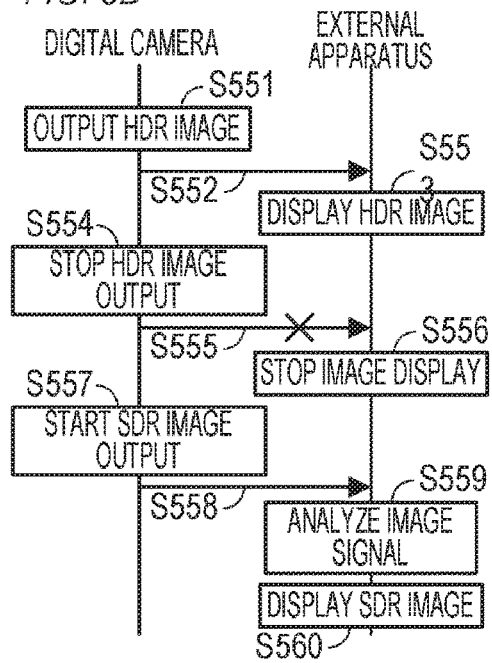

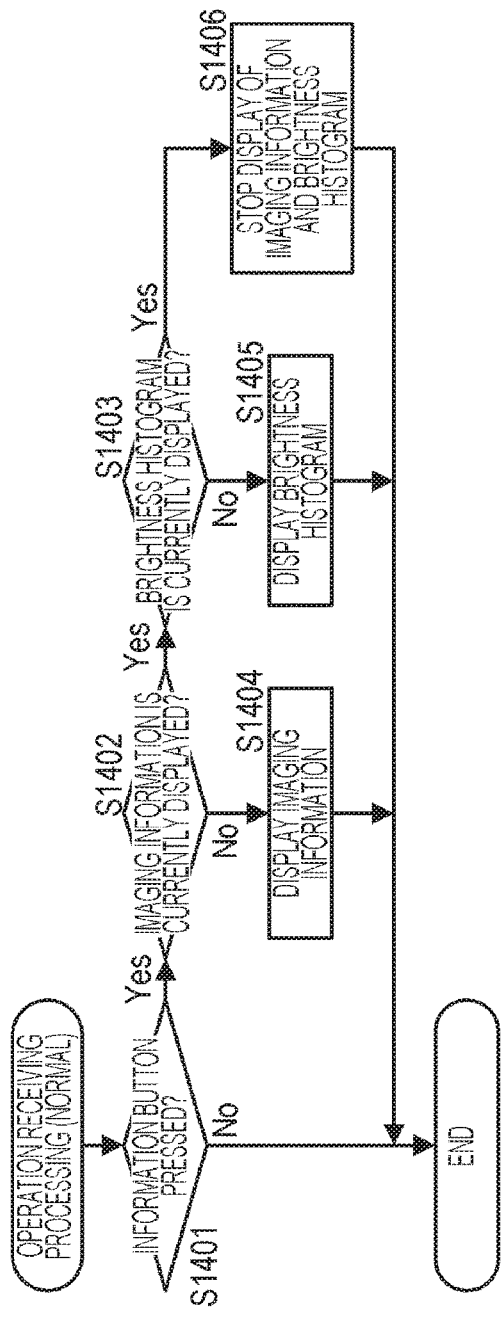
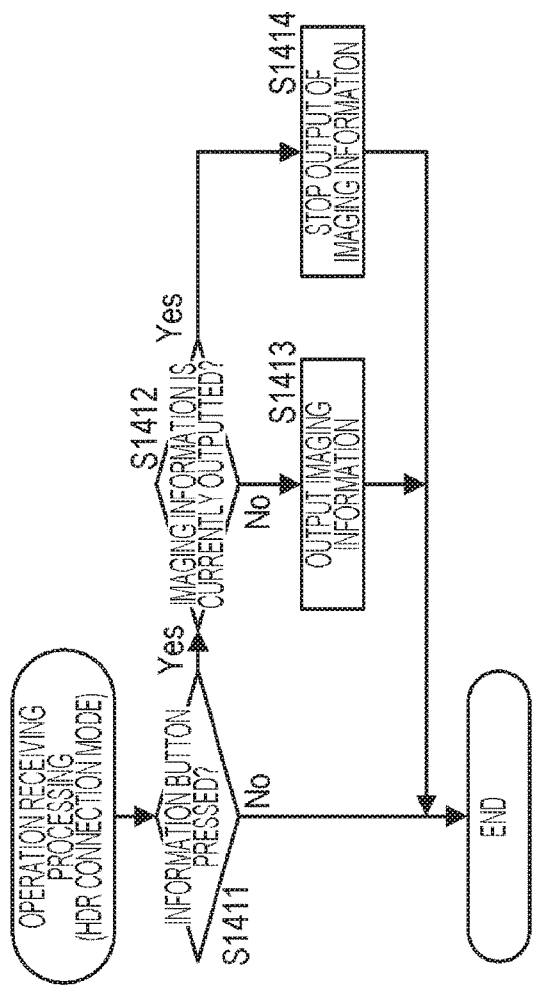

ELECTRONIC APPARATUS

BACKGROUND OF THE INVENTION

Field of the Invention

The present invention relates to an electronic apparatus that outputs HDR images to an external apparatus that can display HDR. HDR stands for high dynamic range, and refers to a dynamic range that is wider than standard dynamic range (SDR).

Description of the Related Art

The screens displayed on a display apparatus include a screen where a graphic representing image information (OSD) is superimposed on an image, a menu screen which includes only graphics for the setting menu and the like. Japanese Patent Application Publication No. 2010-268332 discloses a technique to display an OSD superimposed on an HDR image.

Japanese Patent Application Publication No. 2002-325198 discloses a technique to display a main image first and then display a reduced image (e.g. thumbnail) when an instruction to display the next image is received within a predetermined time.

There is an electronic apparatus that acquires histogram information representing the frequency distribution of brightness (brightness histogram) from a captured image, and outputs the image and the histogram information to an external apparatus (such a display apparatus as a liquid crystal monitor) to display this image and histogram information. By referring to the histogram information, the user can determine whether exposure of the image is appropriate, or whether imaging conditions are appropriate, for example.

An available method of outputting an image to an external apparatus includes a method of performing conversion processing to convert an image into an HDR image having a wide dynamic range, and outputting the HDR image to an external apparatus (HDR image output). Since the conversion processing is performed, the histogram information acquired from the HDR image is different from the histogram information acquired from the image before the conversion processing. HDR stands for high dynamic range, and refers to a dynamic range that is wider than the standard dynamic range (SDR).

Japanese Patent Application Publication No. 2006-33089 discloses a technique to perform correction on the histogram information after image processing to bring the information closer to the histogram information before the image processing, so that the histogram information that is close to the exposure conditions during imaging can be acquired.

When an image is outputted to an external apparatus, in some cases the connection mode must be switched depending on the image (content) to be outputted. If the connection mode is switched, it may take time until the external apparatus becomes ready and displays the image. The electronic apparatus that outputs the image to the external apparatus, on the other hand, cannot determine the timing when the external apparatus displays the image. Therefore if a moving image is reproduced while switching the connection mode, the initial portion of the moving image may not be displayed on the external apparatus, and the user may not see this initial portion.

Japanese Patent Application Publication No. 2003-110563 discloses a technique to output invalid data to an external apparatus when the connection mode is switched, and repeatedly check the state of the external apparatus, so that when the external apparatus is ready, the output of the invalid data is stopped, and output of the moving image is started.

SUMMARY OF THE INVENTION

However, in the case of the HDR display, white may be displayed at a very high brightness. In the case of a screen that is not a natural image, such as a menu screen, bright white is often used as the color for characters, icons, background and the like. Therefore if a screen that is not a natural image is displayed in HDR, the white of the screen may be too bright, and the user may experience an unintended glare.

HDR image output is not disclosed in Japanese Patent Application Publication No. 2002-325198. In the case of HDR image output to display an ideal HDR image based on a RAW image on an external apparatus, processing such as reading the RAW image or developing the RAW image is required. Since the processing takes time, time is required to display an ideal HDR image, and until then, the user cannot view the image under ideal (comfortable) conditions. This problem is conspicuous in the case of displaying a plurality of HDR images corresponding to a plurality of RAW images respectively by switching.

In some cases, images, which are generated from the same original image but which have different gradation resolution and color gamut from one another, may be displayed. For example, this is the case when an SDR image, generated form a RAW image, is displayed on the rear face monitor of a digital camera, and an HDR image, generated from the same RAW image, is displayed on an external monitor connected to the digital camera.

Here it is assumed that the histogram information acquired from the SDR image is displayed together with the HDR image on the external monitor. In this case, it can be determined from the histogram information that the gradation of a bright portion has been lost, but the gradation of the bright portion remains in the HDR image, and this mismatch may cause discomfort to the user.

Then it is assumed that the histogram information is acquired from the HDR image and the acquired histogram information is displayed together with the HDR image on an external monitor. In this case, even if the gradation of the bright portions is near the limit in the SDR image, for example, the user may increase the exposure of the digital camera, determining that the gradation of the bright portion can still be increased based on the histogram information. As a result, the gradation of the bright portion is lost, and an image may be captured at an untended exposure.

This problem is not solved even if the histogram correction is performed according to Japanese Patent Application Publication No. 2006-33089. Beside a histogram, a similar problem occurs when information related to at least one of brightness, gradation and tinge is displayed. In other words, in the case of displaying images which are generated from the same original image, but have different gradation resolution and color gamut from one another, the user may experience discomfort or misunderstanding may occur because of the display of information related to at least one of brightness, gradation and tinge, which may result in an inappropriate operation and imaging.

In the case of the technique according to Japanese Patent Application Publication No. 2003-110563, it must be detected that the external apparatus is ready. However, this detection may be difficult depending on the external apparatus. If readiness of the external apparatus cannot be detected or is detected in error, the reproduction of the moving image cannot be started at an ideal timing, and the moving image cannot be displayed appropriately.

A first aspect of the present invention provides a technique to display various screens appropriately. A second aspect of the present invention provides a technique to display an image appropriately even if this image is a specific type, such as a RAW image. A third aspect of the present invention provides a technique to minimize misunderstandings of the user caused by a display of information related to at least one of brightness, gradation and tinge. A fourth aspect of the present invention provides a technique to display moving images on an external apparatus appropriately, regardless the type of external apparatus.

An electronic apparatus according to the present invention, includes:
- a connector configured to connect with an external apparatus,
- a memory; and
- at least one processor and/or at least one circuit to perform the operations of the following units:
- a setting unit configured to set a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted; and
- a control unit configured to control so that in a case where the connection is in the second connection mode and an instruction to switch a first screen including a captured image captured by an image sensor to a second screen not including a captured image is received, the set connection mode is switched from the second connection mode to the first connection mode, and the second screen is outputted from the connector.

According to the first aspect of the present invention, various screens can be appropriately displayed. According to the second aspect of the present invention, an image can be appropriately displayed even if this image is a specific type, such as a RAW image. According to the third aspect of the present invention, misunderstandings of the user caused by the display of information related to at least one of brightness, gradation and tinge can be minimized. And according to the fourth aspect of the present invention, moving images can be appropriately displayed on an external apparatus, regardless the type of external apparatus.

Further features of the present invention will become apparent from the following description of exemplary embodiments with reference to the attached drawings.

BRIEF DESCRIPTION OF THE DRAWINGS

FIGS. 5A to 5D are flow charts of the digital camera according to the embodiment;

FIGS. 14A and 14B are flow charts of the digital camera according to the embodiment;

DESCRIPTION OF THE EMBODIMENTS

Configuration

Figure 1A:
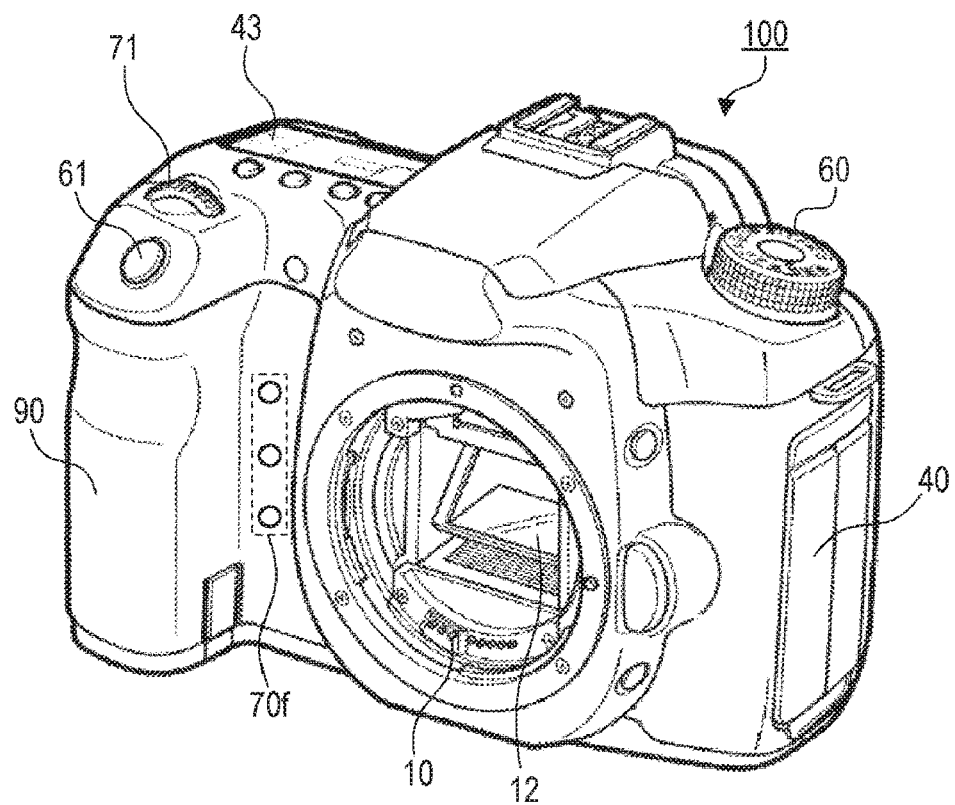
FIGS. 1A and 1B are external views of a digital camera according to the embodiment.
Figure 1B:
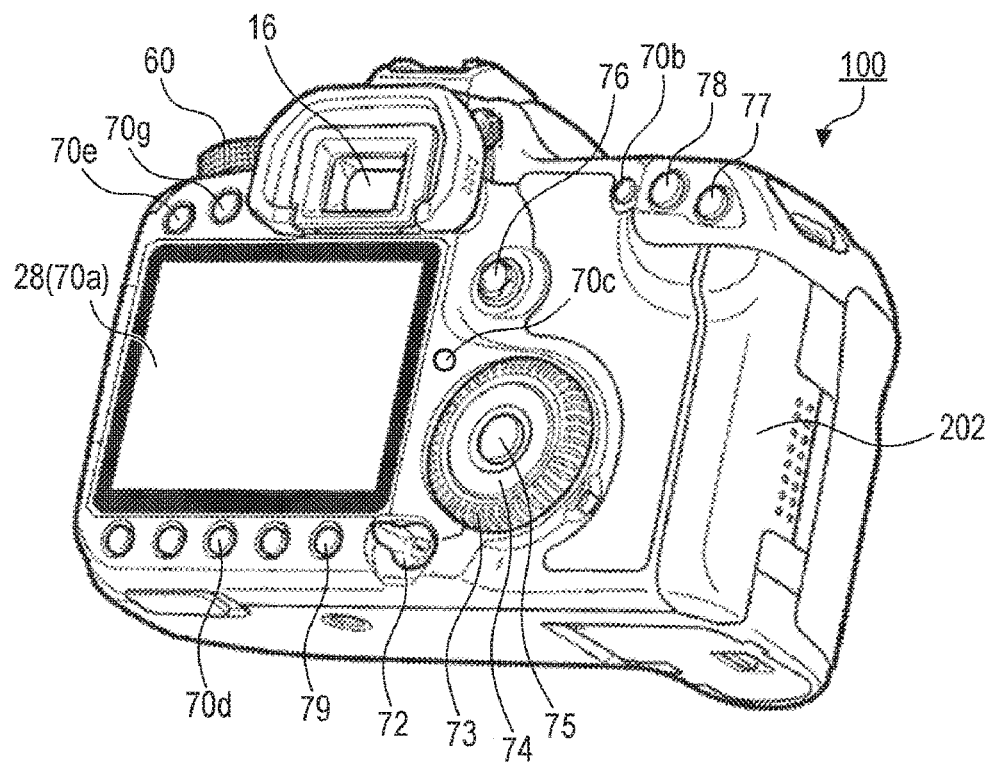

Preferred embodiments of the present invention will be described with reference to the drawings. FIGS. 1A and 1B are external views of a digital camera 100, which is an example of an apparatus to which the present invention can be applied. FIG. 1A is a front perspective view of the digital camera 100, and FIG. 1B is a rear perspective view of the digital camera 100.

A display unit 28 is a display unit which is disposed on the rear face of the digital camera 100, and displays images and various information. A finder outer display unit 43 is a display unit which is disposed on the upper surface of the digital camera 100, and displays various set values of the digital camera 100, including the shutter speed and aperture stop. A terminal cover 40 is a cover that protects connectors (e.g. connection cables) that connect the digital camera 100 to an external apparatus. The connectors include a communication terminal (not illustrated) of a USB cable, and an output I/F 91 (mentioned later), which is an HDMI (registered trademark) output terminal. A quick return mirror 12 can be moved up/down by an actuator (not illustrated), based on an instruction from a system control unit 50 (mentioned later). A communication terminal 10 is a communication terminal for the digital camera 100 to communicate with a lens unit 150 (mentioned later: detachable). An eyepiece finder 16 is a viewable type finder to confirm the focal point and composition of the optical image of the object, which is acquired via a lens unit 150, by observing a focusing screen 13 (mentioned later). A cover 202 is a cover of a slot where a recording medium 200 (mentioned later) is stored. A grip unit 90 is a holding unit having a shape for the user to easily hold the digital camera 100 with their right hand.

The digital camera 100 also has a mode select switch 60, a shutter button 61, a main electronic dial 71, a power switch 72, a sub-electronic dial 73, a four-direction key 74, a SET button 75 and an LV button 76. The digital camera 100 also has a zoom-in button 77, a zoom-out button 78, a playback button 79, a touch panel 70a, an auto focus (AF) ON button 70b, a quick setting button 70c (Q button 70c), and an active frame select button 70d. The digital camera 100 also has a menu button 70e, a function button 70f and an information button 70g. The digital camera 100 may include other operation members. Each of the above mentioned operation members will be described later.

Figure 2:
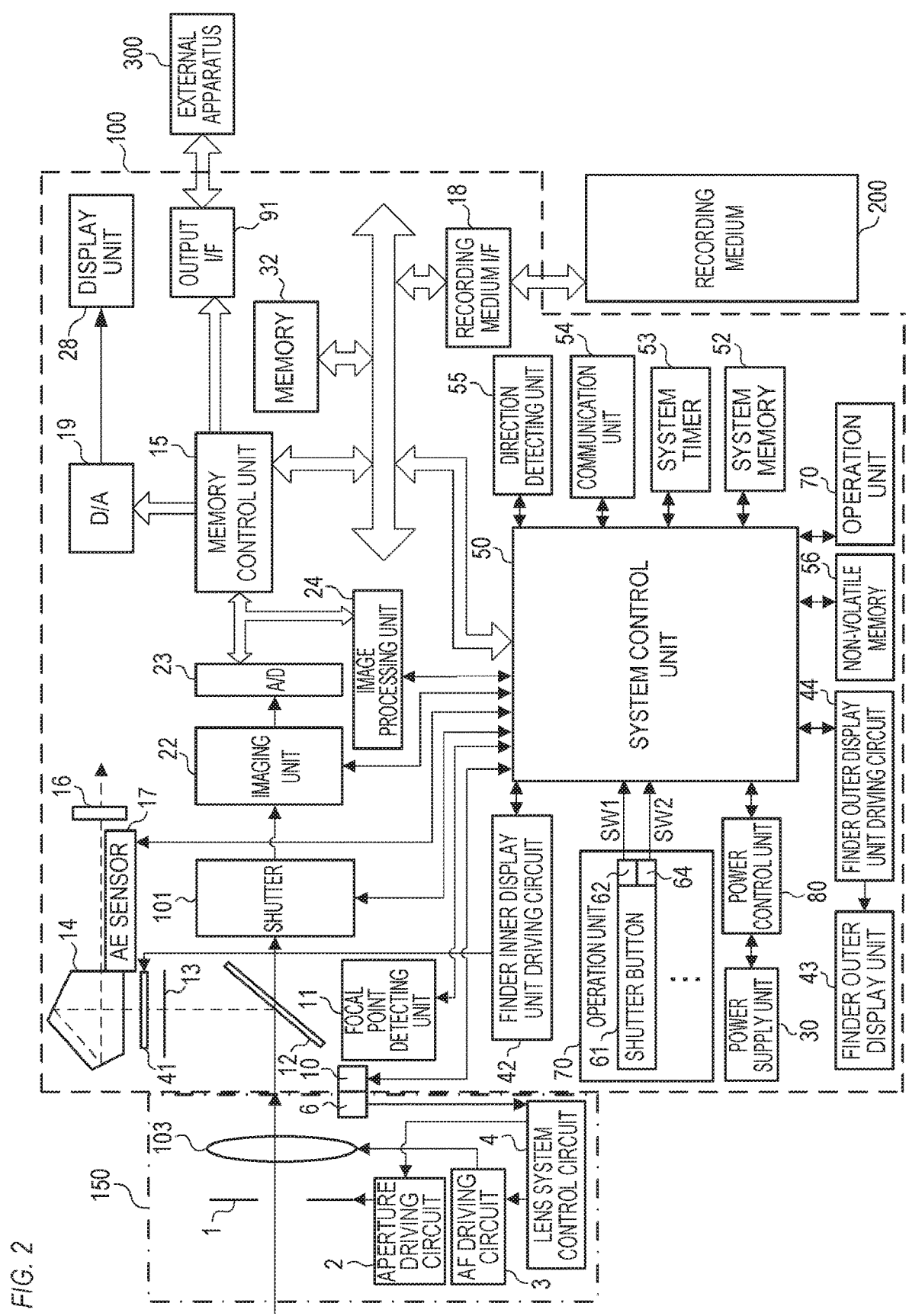
FIG. 2 is a block diagram depicting a configuration example of the digital camera according to the embodiment.

FIG. 2 is a block diagram depicting a configuration example of the digital camera 100.

A lens unit 150 is a lens unit that includes a replaceable imaging lens. A lens 103 is normally constituted of a plurality of lenses, but only one lens is simply illustrated in FIG. 2. A communication terminal 6 is a communication terminal for the lens unit 150 to communicate with the digital camera 100, and a communication terminal 10 is a communication terminal for the digital camera 100 to communicate with the lens unit 150. The lens unit 150 communicates with the system control unit 50 via the communication terminals 6 and 10. The lens unit 150 controls an aperture stop 1 using an internal lens system control circuit 4 via an aperture stop driving circuit 2. Further, the lens unit 150 performs focusing by changing the position of the lens 103 by the lens system control circuit 4 via an AF driving unit 3.

An automatic exposure (AE) sensor 17 measures the brightness of the light of the object (object light) via the lens unit 150.

A focal point detecting unit 11 outputs defocus amount information to the system control unit 50. The system control unit 50 controls the lens unit 150 based on the defocus amount information, and performs phase difference auto focus.

The quick return mirror 12 (mirror 12) can be moved up/down by an actuator (not illustrated) based on an instruction from the system control unit 50 at exposure, live-view image capturing, moving image capturing and the like. The mirror 12 is a mirror to switch the luminous flux that enters from the lens 103 between the finder 16 side and the imaging unit 22 side. The mirror 12 is normally set to guide (reflect) the luminous flux to the finder 16 (mirror down), but in the case of image capturing or live-view display, the mirror 12 is moved up and retracted from the luminous flux, so as to guide the luminous flux to the imaging unit 22 (mirror up). The mirror 12 is a half mirror, so that the center portion thereof can transmit a part of the light, and allows a part of the luminous flux to transmit so as to enter the focal point detecting unit 11 in order to detect a focal point.

The user can check the focus and composition of the optical image of the object acquired via the lens unit 150 by observing the focusing screen 13 through a penta-prism 14 and the finder 16.

A shutter 101 is a focal plane shutter that can freely control the exposure time of the imaging unit 22 by control of the system control unit 50.

The imaging unit 22 is an image pickup element constituted by a CCD, a CMOS element or the like to convert an optical image into an electric signal. An AD convertor 23 converts an analog signal, outputted from the imaging unit 22, into a digital signal.

Image processing unit 24 performs predetermined processing (e.g. pixel interpolation, resizing processing such as reducing, color conversion processing) on the data from the A/D convertor 23 or the data from the memory control unit 15. Further, in the image processing unit 24, predetermined arithmetic processing is performed using the captured image data, and the system control unit 50 controls exposure and distance measurement based on the acquired result. Thereby through the lens (TTL) type AF processing, AE processing, EF (pre-flash emission) processing and the like are performed. Furthermore, in the image processing unit 24, predetermined arithmetic processing is performed using the captured image data, and TTL type auto white balance (AWB) processing is performed based on the acquired result.

The output data from the A/D convertor 23 is written to a memory 32 via the image processing unit 24 and the memory control unit 15, or via the memory control unit 15. The memory 32 stores image data which is acquired by the imaging unit 22, and converted into digital data by the A/D convertor 23 and image data to be displayed on a display unit 28 or on an external apparatus 300 such as an external monitor. The memory 32 has sufficient storage capacity to store a predetermined number of still images, and a predetermined time of moving images and sounds.

The memory 32 is also used as a memory to display images (video memory). A D/A convertor 19 converts the data for displaying images, which is stored in the memory 32, into an analog signal, and supplies this analog signal to the display unit 28. Thus the image data for display, which is written in the memory 32, is displayed by the display unit 28 via the D/A convertor 19. The display unit 28 performs display on the display unit (e.g. LCD) in accordance with the analog signal from the D/A convertor 19. The digital signal, which was converted by the A/D convertor 23 and stored in the memory 32, is converted into an analog signal by the D/A convertor 19, and is sequentially transferred to the display unit 28 and displayed, whereby the function of the electronic view finder can be implemented, and through image display (live-view display) can be performed.

On a finder inner display unit 41, a frame to indicate a distance measuring point where auto focus is currently being performed (AF frame), icons to indicate the setting states of the camera and the like are display by a finder inner display unit driving circuit 42.

On a finder outer display unit 43, various set values of the digital camera 100, such as shutter speed and aperture stop are displayed by a finder outer display unit driving circuit 44.

The output I/F 91 supplies the data for displaying images stored in the memory 32 to the external apparatus 300 in the digital signal state. In this way, the image data for display written in the memory 32 is displayed on the external apparatus 300.

A non-volatile memory 56 is a memory that can be erased or recorded electrically, an EEPROM, for example, can be used. The non-volatile memory 56 stores constants and programs for operation of the system control unit 50, for example. Programs here refers to programs for executing various flow charts described later according to the embodiments.

The system control unit 50 is a control unit that includes at least one processor, and controls the entire digital camera 100. The system control unit 50 implements each processing of the embodiments described later by executing the programs recorded in the above mentioned non-volatile memory 56. The system memory 52 is RAM, for example, and the system control unit 50 develops the constants and variables for operating the system control unit 50, programs read from the non-volatile memory 56 and the like on the system memory 52. Further, the system control unit 50 also performs display control by controlling the memory 32, the D/A convertor 19, the output I/F 91, the display unit 28 and the like.

A system timer 53 is a clocking unit that measures the time used for various controls and the time of the internal clock.

A power supply control unit 80 is constituted of a battery detecting circuit, a DC/DC convertor, a switch circuit to switch an energizing block and the like, and detects whether a battery is attached, a battery type and residual charge of a battery. Based on the detection result and instruction from the system control unit 50, the power supply control unit 80 controls the DC-DC convertor and supplies the necessary voltage to each unit, including the recording medium 200, during a necessary period.

A power supply unit 30 is constituted of a primary battery (e.g. alkali batter, lithium battery), a secondary battery (e.g. NiCd battery, NiMH battery, Li battery), an AC adapter and the like. A recording medium/F 18 is an interface with such a recording medium 200 as a memory card and hard disk. The recording medium 200 is a memory card, for example, to record captured images, and is constituted of a semiconductor memory, a magnetic disk or the like.

A communication unit 54 transmits/receives an image signal and sound signal to/from an external apparatus connected wirelessly or via cable. The communication unit 54 can also be connected via a wireless local area network (LAN) or the Internet. The communication unit 54 can send an image (including a through image) captured by the imaging unit 22 and an image recorded in the recording medium 200, and can receive image data and various other information from an external apparatus.

A direction detecting unit 55 detects a direction of the digital camera 100 with respect to the direction of gravity. Based on the direction detected by the direction detecting unit 55, it can be determined whether an image captured by the imaging unit 22 is an image captured by holding the digital camera 100 in a horizontal position or an image captured by holding the digital camera 100 in a vertical position. The system control unit 50 can add the direction information in accordance with the direction detected by the direction detecting unit 55 to an image file of an image captured by the imaging unit 22, or can record the image in a rotated position. For the direction detecting unit 55, an acceleration sensor, a gyro sensor or the like can be used.

An operation unit 70 is an operation unit to input various operation instructions to the system control unit 50. The operation unit 70 includes various operating members which function as input units to receive operation input by the user (user operation). In concrete terms, the operation unit 70 includes the mode select switch 60, the shutter button 61, the main electronic dial 71, the power switch 72, the sub-electronic dial 73, the four-direction keys 74, the SET button 75, the LV button 76, the zoom-in button 77 and the zoom-out button 78. The operating members include the playback button 79, the touch panel 70a, the AF ON button 70b, the Q button 70c, the active frame select button 70d, the menu button 70e, the function button 70f and the information button 70g. Each operating member of the operation unit 70 functions as a specific functional buttons, to which an appropriate function is assigned for each situation by selecting and operating various functional icons displayed on the display unit 28 or the external apparatus 300. The functional buttons are, for example, an end button, a return button, an image forward button, a jump button, a narrow down button, and an attribute change button.

The mode select switch 60 is an operation member to switch between various modes. The mode select switch 60 switches the operation mode of the system control unit 50 to a still image recording mode, a moving image capturing mode, a reproduction mode or the like. Modes included in the still image recording mode are, for example: auto imaging mode, auto scene determining mode, manual mode, aperture top priority mode (Av mode), and a shutter speed priority mode (Tv mode). Further, the still image recording mode also includes various scene modes to set imaging for each imaging scene, a program AE mode and a custom mode. The mode select switch 60 is used to switch the mode to one of these modes. After switching to an imaging mode list screen by the mode select switch 60, the mode may be switched to one of the plurality of modes displayed in this list using another operating member. In the same manner, a plurality of modes may be included in the moving image capturing mode.

The shutter button 61 is an operating member to instruct imaging. The shutter button 61 includes a first shutter switch 62 and a second shutter switch 64. The first shutter switch 62 is turned ON in the middle of operating the shutter button 61, that is, in the half depressed state (imaging preparation instruction), and generates a first shutter switch signal SW1. The system control unit 50 starts operation of the AF processing, AE processing. AWB processing. EF processing or the like by the first shutter switch signal SW1. The second shutter switch 64 is turned ON when operation of the shutter button 61 is completed, that is, in full depressed state (imaging instruction), and generates a second shutter switch signal SW2. By the second shutter switch signal SW2, the system control unit 50 starts a series of imaging operations: from the reading of the signal from the imaging unit 22 to the writing of the image data to the recording medium 200.

The main electronic dial 71 is a rotational operating member, and by turning the main electronic dial 71, such an operation as changing the setting values of the shutter speed and aperture stop can be performed. The power switch 72 is an operating member of the digital camera 100 to switch ON/OFF of the power supply. The sub-electronic dial 73 is a rotary operating member, and by turning the sub-electronic dial 73, such operations as moving the selection frame and image forwarding can be performed. The four-direction key 74 is configured such that each part (top, bottom, left and right), can be depressed. Processing can be performed in accordance with the depressed part of the four-direction key 74. In this embodiment, the four-direction key 74 is one integrated operating member, but a top button, a bottom button, a left button and a right button may be disposed as independent direction buttons respectively. Herein below, the top or bottom portion is called a "vertical key", and the left or right portion is called a "horizontal key". The SET button 75 is a push button, and is mainly used for determining a selected item.

The LV button 76 is a button to switch ON/OFF the live-view (LV) in the still image capturing mode. In the moving image capturing mode, the LV button 76 is used to instruct a start or stop of the moving image capturing (recording). The zoom-in button 77 is an operation button to switch ON/OFF the zoom-in mode and to change magnification in the zoon-in mode when live-view display is performed in the imaging mode. In the reproduction mode, the zoom-in button 77 functions as a zoom-in button to enlarge a reproduced image or to increase the magnification thereof. The zoom-out button 78 is a button to reduce the displayed image by decreasing the magnification of the enlarged reproduced image. The playback button 79 is an operation button to switch between the imaging mode and the reproduction mode. If the playback button 79 is pressed in the imaging mode, the mode shifts to the reproduction mode, in which the latest image of the images recorded in the recording medium 200 can be displayed on the display unit 28 or the external apparatus 300.

The touch panel 70a detects contact to the touch panel 70a. The touch panel 70a and the display unit 28 may be integrated. For example, the touch panel 70a can be configured such that the transmittance of the light will not interfere with the display of the display unit 28, and can be installed on the upper layer of the display surface of the display unit 28. Then the input coordinates on the touch panel 70a and the display coordinates on the display unit 28 are corresponded to each other. Thereby a graphic user interface (GUI), in which the user can directly interact via the screen displayed on the display unit 28, can be constructed. The system control unit 50 can detect the operations below when contacting the touch panel 70a or can detect the state of the touch panel 70a.

A finger or pen which did not touch the touch panel 70a touches the touch panel 70a for the first time, in other words, touch is started (hereafter called 'Touch-Down')

A finger or pen is touching the touch panel 70a (hereafter called "Touch-On")

A finger or pen is moving while touching the touch panel 70a (hereafter called "Touch-Move")

A finger or pen, which was touching the touch panel 70a, is released from the touch panel 70a, in other words, touch is ended (hereafter called "Touch-Up")

Nothing is touching the touch panel 70a (hereafter called "Touch-Off")

When Touch-Down is detected, Touch-On is detected at the same time. After Touch-Down, normally Touch-On continues to be detected unless Touch-Up is detected. When Touch-Move is detected as well, Touch-On is detected at the same time. Even if Touch-On is detected, Touch-Move is not detected unless the touch position is moving. When Touch-Up of all the fingers and a pen is detected, Touch-Off is detected.

These operations, states and the positional coordinates on the touch panel 70a where a finger or pen is touching are notified to the system control unit 50 via an internal bus. Then, based on the information that is notified, the system control unit 50 determines which operation (touch operation) was performed on the touch panel 70a. For Touch-Move, the moving direction of the finger or pen moving on the touch panel 70a can also be determined for each vertical component and horizontal component on the touch panel 70a, based on the change of the positional coordinates. If the Touch-Move of at least a predetermined distance is detected, it is determined that a sliding operation was performed. An operation of quickly moving a finger touching the touch panel 70a for a certain distance then releasing is called "flicking". In other words, flicking is an operation of quickly moving on then releasing the finger from the touch panel 70a. When Touch-Move for at least a predetermined distance at a predetermined speed or more is detected, and Touch-Up is detected immediately after this, the flicking operation is determined (it is determined that flicking was performed immediately after the sliding operation). Further, a touch operation of touching a plurality of locations (e.g. two points) at the same time and drawing these touch positions close together is called "pinch-in", and a touch operation of spreading these touch positions apart is called "pinch-out". "Pinch-out" and "pinch-in" are collectively referred to as "pinch-operation" (or simply referred to a "pinch"). For the touch panel 70a, any touch panel, of the various types (resistive film type, capacitance type, surface acoustic wave type, infrared type, electromagnetic indication type, image recognition type, optical sensor type) can be used. Either a type of detecting touch by contacting the touch panel or a type of detecting touch by an approach of a finger or pen to the touch panel may be used.

The menu button 70e is a push button switch, and a menu screen, to set various settings, is displayed on the display unit 28 or the external apparatus 300 by pressing the menu button 70e. The user can intuitively perform various settings using the menu screen displayed on the display unit 28 or the external apparatus 300, the four-direction key 74 and the SET button 75.

The information button 70g is a push button switch, and is used for switching between various information displays, for example.

Figure 3:
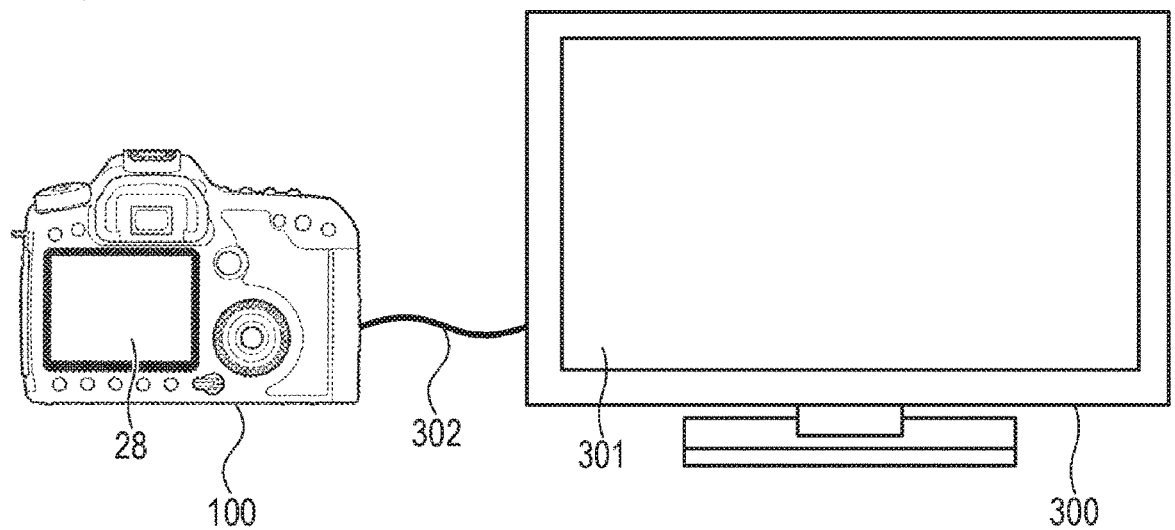
FIG. 3 is a diagram depicting a connection between the digital camera and an external apparatus according to the embodiment.

FIG. 3 is a diagram depicting a connection between the digital camera 100 and the external apparatus 300. The output I/F 91 of the digital camera 100 and the external apparatus 300 can be connected using an HDMI (registered trademark) cable 302, which is a connection cable. When an HDMI connection is performed, the light of the display unit 28 of the digital camera 100 turns OFF, and the image displayed on the digital camera 100 is displayed on a display unit (external display unit) 301 of the external apparatus 300.

Reproduction Mode Processing (Main Unit)

Figure 4:
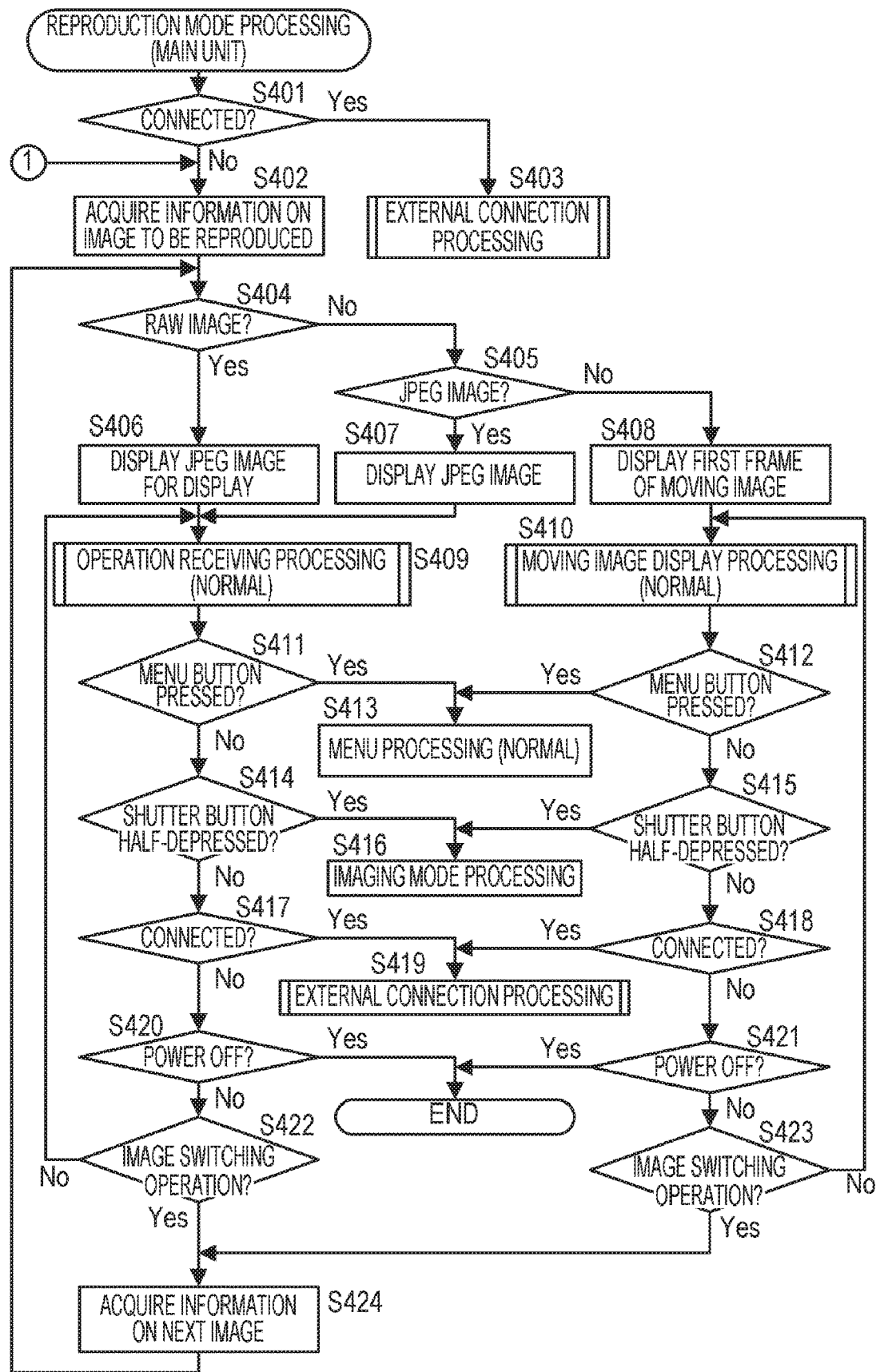
FIG. 4 is a flow chart of the digital camera according to the embodiment.

FIG. 4 is a flow chart depicting the details of the reproduction mode processing performed by the digital camera 100. This processing is implemented when the program recorded in the non-volatile memory 56 is developed in the system memory 52, and the system control unit 50 executes the program.

In S401, the system control unit 50 determines whether the digital camera 100 is connected to the external apparatus 300. Processing advances to S403 if it is determined that the digital camera 100 and the external apparatus 300 are connected, or to S402 if not.

In S402, the system control unit 50 acquires the information on the image to be reproduced from the file of this image. The information to be acquired is metadata (including attribute information), a file name and the like. The file of the image to be reproduced is recorded in the recording medium 200, and the information on this image is loaded from the recording medium 200 to the system memory 52 using the recording medium I/F 18.

In S403, the system control unit 50 performs processing to connect the digital camera 100 and the external apparatus 300. The connection processing (external connection processing) will be described in detail later with reference to FIGS. 5A to 5D.

In S404, the system control unit 50 determines whether the image to be reproduced is a RAW image (image before developing processing) based on the information acquired in S402 and in the later mentioned S424 (e.g. metadata and file name of image to be reproduced). Processing advances to S406 if it is determined that the image to be reproduced is a RAW image, or to S405 if not. A file of the RAW image, that is, a RAW file, includes a RAW image, a JPEG image for display, a DCF thumbnail image and the like.

In S405, the system control unit 50 determines whether the image to be reproduced is a JPEG image based on the information acquired in S402 and in the later mentioned S424 (e.g. metadata and file name of image to be reproduced). Processing advances to S407 if it is determined that the image to be reproduced is a JPEG image, or to S408 if not. The JPEG image here is not a JPEG image for display which is included in the RAW file, but an independent JPEG file.

Figure 10:
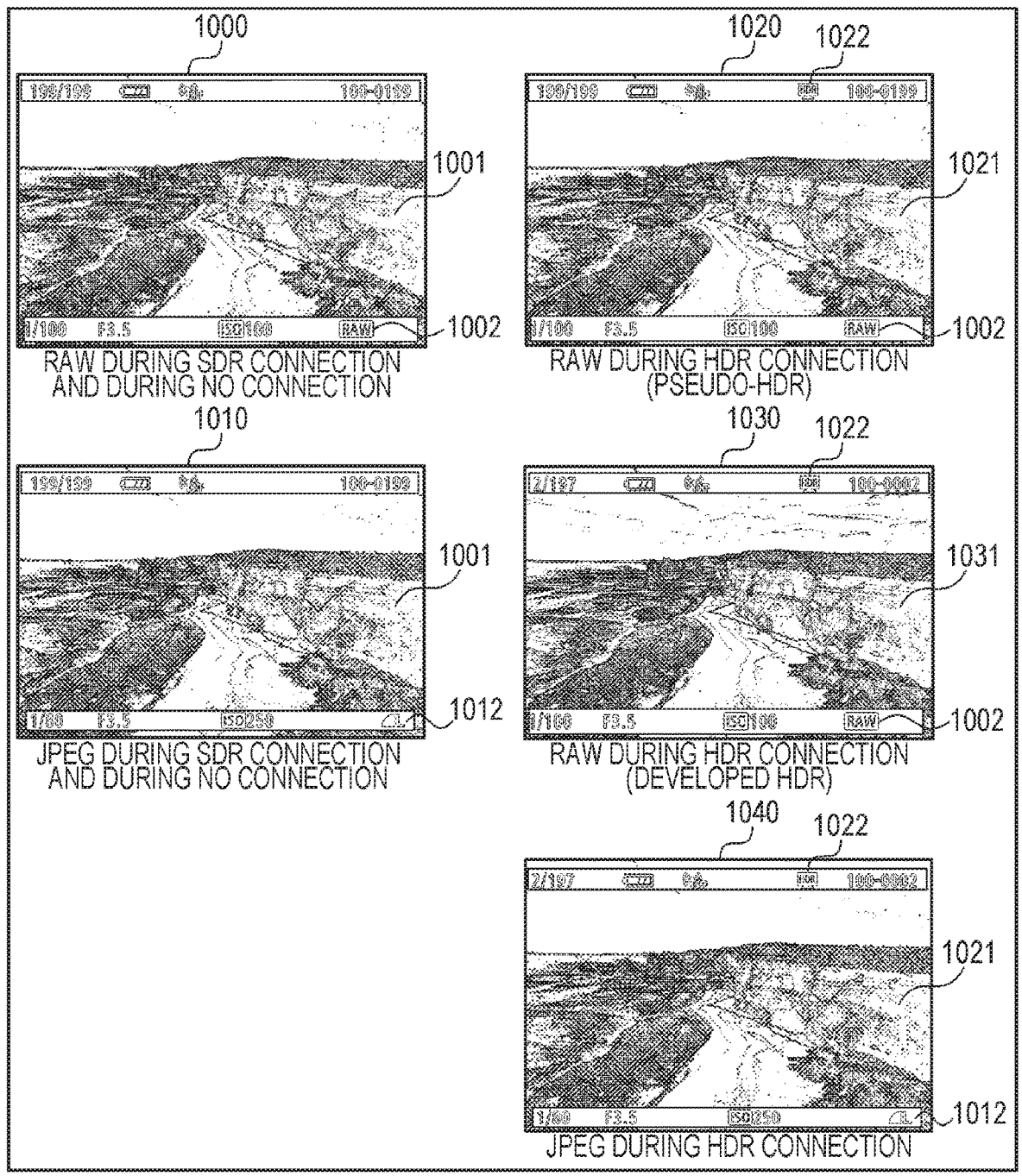
FIG. 10 is a screen example of the digital camera/external apparatus according to the embodiment.

In S406, the system control unit 50 reads only the JPEG file for display (accompanying image), which is recorded in association with the RAW image to be reproduced, from the recording medium 200, and displays this image on the display unit 28. For example, the reproduction screen 1000 in FIG. 10 is displayed on the display unit 28. The reproduction screen 1000 includes a reproduced image 1001 which is displayed based on the JPEG image (JPEG image for display) and an item (icon) 1002 to indicate that a RAW image is being displayed. Various items that can be used are an icon, guidance and the like. The icon 1002 is an icon that indicates the compression rate and the number of pixels (resolution, image size). Since the compression rate is displayed, it can be identified that this image is an image generated by compressing the reproduced image 1001, that is, this is not an image of a RAW file but an image of a compression-coded image file, such as a JPEG file.

In S407, the system control unit 50 reads the JPEG file to be reproduced from the recording medium 200, and displays the image on the display unit 28. For example, a reproduction screen 1010 in FIG. 10 is displayed on the display unit 28. The reproduction screen 1010 includes a reproduced image 1001 displayed based on the JPEG image and an icon 1012 to indicate that the JPEG image is being displayed.

In S408, the system control unit 50 reads a moving image to be reproduced from the recording medium 200, and displays the first frame of this moving image on the display unit 28. For example, a moving image reproduction preparation screen 1850 in FIG. 18B is displayed on the display unit 28. The moving image reproduction preparation screen 1850 includes an image 1851 of the first frame of the moving image, and an item 1852 to instruct the start of reproduction of this moving image. An item that indicates that a moving image is currently being displayed may be included in the moving image reproduction preparation screen.

In S409, the system control unit 50 performs the operation receiving processing. The operation receiving processing, in the case when the digital camera 100 is not connected to the external apparatus 300, will be described later with reference to FIG. 14A.

In S410, the system control unit 50 performs the moving image display processing. The moving image display processing, in the case when the digital camera 100 is not connected to the external apparatus 300, will be described later with reference to FIG. 8A.

In S411, the system control unit 50 determines whether the user pressed the menu button 70e. Processing advances to S413 if it is determined that the menu button 70e was pressed, or to S414 if not. In S412 as well, the system control unit 50 determines whether the menu button 70e was pressed. Processing advances to S413 if it is determined that the menu button 70e was pressed, or to S415 if not. In S413, the system control unit 50 performs the menu processing. The menu processing, in the case when the digital camera 100 is not connected to the external apparatus 300 will be described in detail later.

In S414, the system control unit 50 determines whether the user half-depressed the shutter button 61. Processing advances to S416 if it is determined that the shutter button 61 was half-depressed, or to S417 if not. In S415 as well, the system control unit 50 determines whether the shutter button 61 was half-depressed. Processing advances to S416 if it is determined that the shutter button 61 was half-depressed, or to S418 if not.

Figure 13:
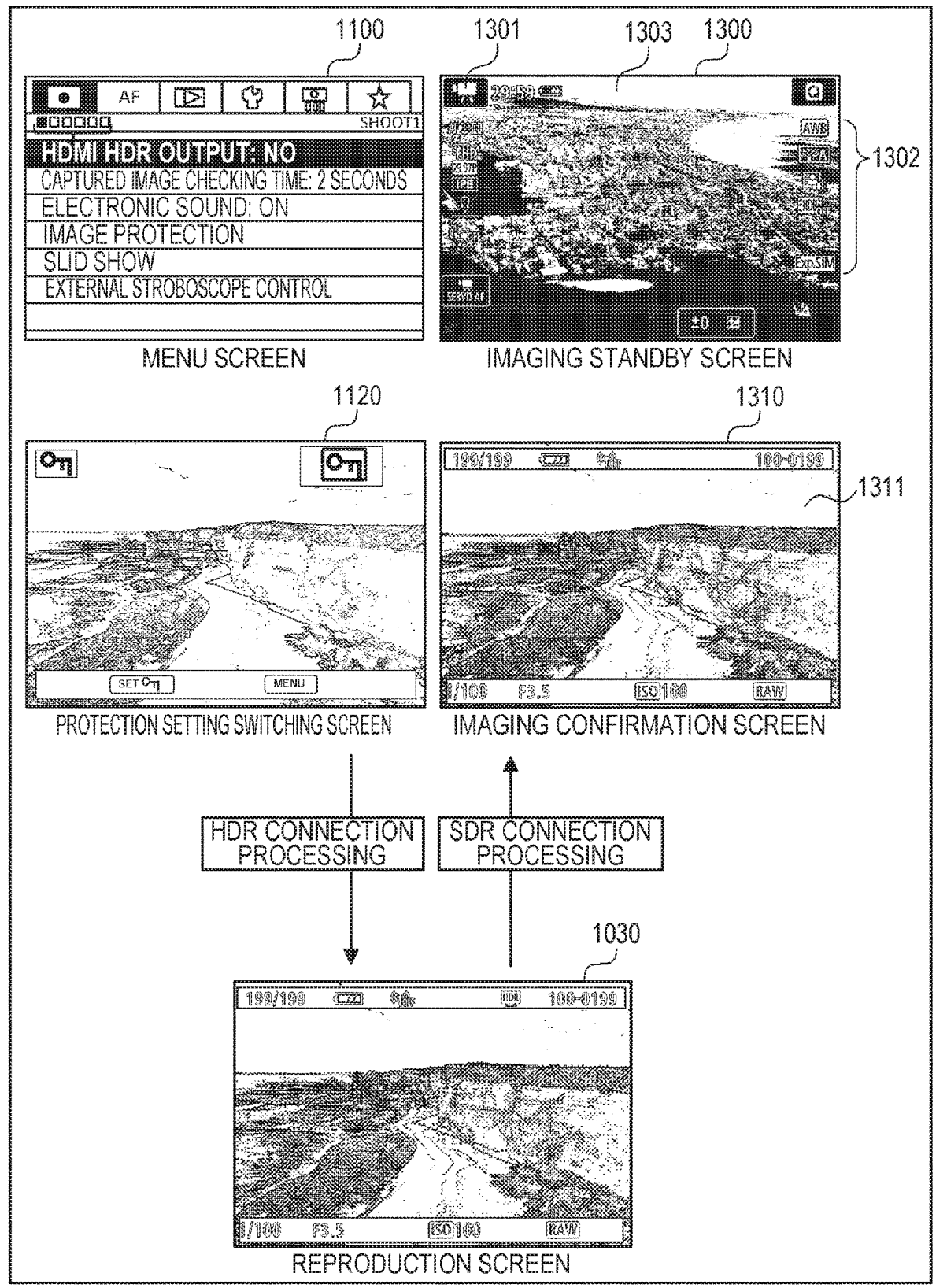
FIG. 13 is a screen example of the digital camera/external apparatus according to the embodiment.

In S416, the system control unit 50 performs the imaging mode processing. The imaging mode is a mode for performing imaging. By the imaging mode processing, an imaging standby screen 1300 in FIG. 13, for example, is displayed on the display unit 28. The imaging standby screen 1300 includes an icon 1301 to indicate the imaging mode, an icon 1302 to indicate various information that is set in the digital camera 100, and a live-view image 1303 which indicates the object in real-time. In the imaging processing, the system control unit 50 performs imaging in accordance with the imaging instruction, and automatically switches the display screen of the display unit 28 to an imaging confirming screen (quick review screen) of the captured image acquired by this imaging operation. For example, the imaging confirming screen 1310 in FIG. 13 is displayed on the display unit 28. The imaging confirming screen 1310 is a screen to confirm the image captured by the imaging just performed, and includes a reproduced image 1311 of the captured image acquired by the imaging just performed.

In S417, the system control unit 50 determines whether the digital camera 100 is connected to the external apparatus 300. Processing advances to S419 if it is determined that the digital camera 100 and the external apparatus 300 are connected, or to S420 if not. In S418 as well, the system control unit 50 determines whether the digital camera 100 is connected to the external apparatus 300. Processing advances to S419 if it is determined that the digital camera 100 is connected to the external apparatus 300, or to S421 if not. In S419, the system control unit 50 performs the later mentioned external connection processing in accordance with FIGS. 5A to 5D.

In S420, the system control unit 50 determines whether the user operated the power switch 72 and instructed power off. The reproduction mode processing ends if it is determined that power off was instructed, or processing advances to S422 if not. In S421 as well, the system control unit 50 determines whether the user instructed power off. The reproduction mode processing ends if it is determined that power off was instructed, or processing advances to S423 if not.

In S422, the system control unit 50 determines whether the user performed the image switching operation using the operation unit 70. Processing advances to S424 if it is determined that the image switching operation was performed, or to S409 if not. In S423 as well, the system control unit 50 determines whether the user performed the image switching operation. Processing advances to S424 if it is determined that the image switching operation was performed, or to S410 if not.

In S424, the system control unit 50 acquires the information on the image to be reproduced next (e.g. metadata, file name) from the file of this image.

External Connection Processing

FIG. 5A is a flow chart depicting details of the external connection processing (S403 and S419 in FIG. 4). This processing is implemented when the program recorded in the non-volatile memory 56 is developed in the system memory 52, and the system control unit 50 executes the program.

In step S501, the system control unit 50 determines whether the external apparatus 300 supports HDR image signals (whether the external apparatus 300 is capable of performing an HDR display). Processing advances to S502 if it is determined that the external apparatus 300 supports HDR image signal, or to S504 if not. HDR stands for high dynamic range, and is a dynamic range that is wider than standard dynamic range (SDR).

In S502, the system control unit 50 determines whether the HDR output setting (a setting to enable output of HDR image signals, that is, a setting to select HDR connection mode in a usual state) is enabled in the digital camera 100. Processing advances to S503 if it is determined that the HDR output setting is enabled, or to S504 if not. The HDR connection mode is a connection mode to output an HDR image.

In S503, the system control unit 50 sets the HDR connection mode, and performs the reproduction mode processing. The reproduction mode processing, in the case when the digital camera 100 is connected to the external apparatus 300 in the HDR connection mode, will be described in detail later with reference to FIG. 6.

In S504, the system control unit 50 sets the SDR connection mode, and performs the reproduction mode processing. The SDR connection mode is a connection mode to output the SDR images. The reproduction mode processing, in the case when the digital camera 100 is connected to the external apparatus 300 in the SDR connection mode, will also be described in detail later.

FIG. 5B is a sequence diagram depicting a control procedure between the digital camera 100 and the external apparatus 300, in the case when the digital camera 100 and the external apparatus 300 are interconnected. In the description in this embodiment, it is assumed that the digital camera 100 and the external apparatus 300 are connected by an HDMI connection.

In S511, the system control unit 50 instructs the output I/F 91 to start transmission of a +5V signal, and the output I/F 91 starts to transmit the +5V signal. The transmitted+5V signal is transmitted to the external apparatus 300 via a +5V signal line (not illustrated) of the connection cable 302. The external apparatus 300 receives the +5V signal via the connection cable 302.

In S512, by reception of the +5V signal, the external apparatus 300 detects that the digital camera 100 is connected via the connection cable 302.

In S513, the external apparatus 300 starts transmitting a hot plug detect (HPD) signal to an HPD signal line (not illustrated) of the connection cable 302. The output I/F 91 of the digital camera 100 receives the transmitted HPD signal via the connection cable 302. When the HPD signal is received, the output I/F 91 notifies the reception of the HPD signal to the system control unit 50.

In S514, by the reception notification of the HPD signal, the system control unit 50 detects that the external apparatus 300 is connected. The processing in S514 corresponds to the processing in S401, S417 and S418 in FIG. 4. The system control unit 50 determines that the digital camera 100 is connected to the external apparatus 300 in a period when the HPD signal is being received, and determines that the digital camera 100 is not connected to the external apparatus 300 in the other periods.

In S515, the system control unit 50 controls the output I/F 91 and transmits an extended display identification data (EDIT) request signal via the connection cable 302. The transmitted EDID request signal is transmitted to the external apparatus 300 via an EDID signal line (not illustrated) of the connection cable 302. The external apparatus 300 receives the EDID request signal.

In S516, the external apparatus 300 transmits the EDID to the EDID signal line (not illustrated) of the connection cable 302. The output I/F 91 of the digital camera 100 receives the transmitted EDID via the connection cable 302. When the EDID is received, the output I/F 91 notifies the reception of the EDID to the system control unit 50.

In S517, the system control unit 50 instructs the output I/F 91 to copy the EDID received in S516 to the system memory 52. After the copying completes, the system control unit 50 analyzes the EDID developed in the system memory 52, and determines which image signal the external apparatus 300 is capable of receiving. The processing in S517 corresponds to the processing in S501 in FIG. 5A.

In S518, the system control unit 50 determines whether the HDR output setting is enabled. If the external apparatus 300 can receive the HDR image signal and the HDR output setting is enabled, the system control unit 50 determines that the HDR image signal is outputted to the external apparatus 300. If not, the system control unit 50 determines that the SDR image signal is outputted to the external apparatus 300. The processing in S518 corresponds to the processing in S502 in FIG. 5A.

In S519, the system control unit 50 instructs the output I/F 91 to start transmission of the image signal (HDR image signal or SDR image signal) determined in S518. The processing in S519 corresponds to the processing in S503 and S504 in FIG. 5A.

In S520, the output I/F 91 of the digital camera 100 outputs the image signal determined in S518 to a transition minimized differential signaling (TMDS) signal line (not illustrated) of the connection cable 302, and the external apparatus 300 receives this image signal via the TMDS signal line (not illustrated) of the connection cable 302.

In S521, the external apparatus 300 analyzes the image signal received in S518, and if the driving setting of the external display unit 301 is a setting which does not allow display of this image signal, the external apparatus 300 switches the driving setting of the external display unit 301 to a setting which allows display of this image signal.

In S522, the external apparatus 300 displays the image signal received in S518 on the external display unit 301.

FIG. 5C is a sequence diagram depicting a control procedure when the connection mode with the external apparatus 300 is switched from the SDR connection mode to the HDR connection mode. In this sequence, it is assumed that the connection between the digital camera 100 and the external apparatus 300 has completed in the sequence described in FIG. 5B, and the SDR connection mode is set here.

In S531, the system control unit 50 instructs the output I/F 91 to transmit the SDR image signal. In S532, the output I/F 91 of the digital camera 100 outputs the SDR image signal to the TMDS signal line (not illustrated) of the connection cable 302, and the external apparatus 300 receives the SDR image signal via the TMDS signal line (not illustrated) of the connection cable 302. In S533, the external apparatus 300 displays the SDR image signal received in S532 on the external display unit 301.

While the SDR connection mode is being set, the SDR image is displayed on the external display unit 301 by repeating the processing in S531 to S533. When the connection mode that is set is switched from the SDR connection mode to the HDR connection mode, the processing in S534 and later is executed.

In S534, the system control unit 50 instructs the output I/F 91 to stop output of the SDR image signal. In S535, the output I/F 91 of the digital camera 100 stops output of the SDR image signal to the TMDS signal line (not illustrated) of the connection cable 302. Thereby the external apparatus 300 stops reception of the SDR image signal via the TMDS signal line (not illustrated) of the connection cable 302. In S536, the external apparatus 300 stops display of the image on the external display unit 301, since reception of the image signal from the digital camera 100 stopped.

In S537, the system control unit 50 instructs the output I/F 91 to transmit the HDR image signal. In S538, the output I/F 91 of the digital camera 100 outputs the HDR image signal to the TMDS signal line (not illustrated) of the connection cable 302, and the external apparatus 300 receives the HDR image signal via the TMDS signal line (not illustrated) of the connection cable 302.

IN S539, the external apparatus 300 analyzes the image signal received in S538, and switches the driving setting of the external display unit 301 to a setting which allows display of the HDR image signal. In S540, the external apparatus 300 displays the HDR image signal received in S538 on the external display unit 301. Here the processing times in S539 and S540 are different depending on the performance of the external apparatus 300, and it takes about 1 to 5 seconds until the image is displayed.

FIG. 5D is a sequence diagram depicting a control procedure when the connection mode with the external apparatus 300 is switched from the HDR connection mode to the SDR connection mode. In this sequence, it is assumed that the connection between the digital camera 100 and the external apparatus 300 has completed in the sequence described in FIG. 5B, and the HDR connection mode is set here.

In S551, the system control unit 50 instructs the output I/F 91 to transmit the HDR image signal. In S552, the output I/F 91 of the digital camera 100 outputs the HDR image signal to the TMDS signal line (not illustrated) of the connection cable 302, and the external apparatus 300 receives the HDR image signal via the TMDS signal line (not illustrated) of the connection cable 302. In S553, the external apparatus 300 displays the HDR image signal received in S552 on the external display unit 301.

While the HDR connection mode is set, the HDR image is displayed on the external display unit 301 by repeating the processing in S551 to S553. When the currently set connection mode is switched from the HDR connection mode to the SDR connection mode, the processing in S554 and later is executed.

In S554, the system control unit 50 instructs the output I/F 91 to stop output of the HDR image signal. In S555, the output I/F 91 of the digital camera 100 stops output of the HDR image signal to the TMDS signal line (not illustrated) of the connection cable 302. Thereby the external apparatus 300 stops reception of the HDR image signal via the TMDS signal line (not illustrated) of the connection cable 302. In S556, the external apparatus 300 stops display of the image on the external display unit 301, since reception of the image signal from the digital camera 100 stopped.

In S557, the system control unit 50 instructs the output I/F 91 to transmit the SDR image signal. In S558, the output I/F 91 of the digital camera 100 outputs the SDR image signal to the TMDS signal line (not illustrated) of the connection cable 302, and the external apparatus 300 receives the SDR image signal via the TMDS signal line (not illustrated) of the connection cable 302.

In S559, the external apparatus 300 analyzes the image signal received in S558, and switches the driving setting of the external display unit 301 to a setting which allows display of the SDR image signal. In S560, the external apparatus 300 displays the SDR image signal received in S558 on the external display unit 301. Here the processing times in S559 and S560 are different depending on the performance of the external apparatus 300, and it takes about 1 to 5 seconds until the image is displayed.

In the description in FIGS. 5A to 5D, an HDMI connection is used for connection with the external apparatus 300, but connection using Display Port or other digital connecting unit may be performed.

Reproduction Mode Processing (HDR Connection Mode)

Figure 6:
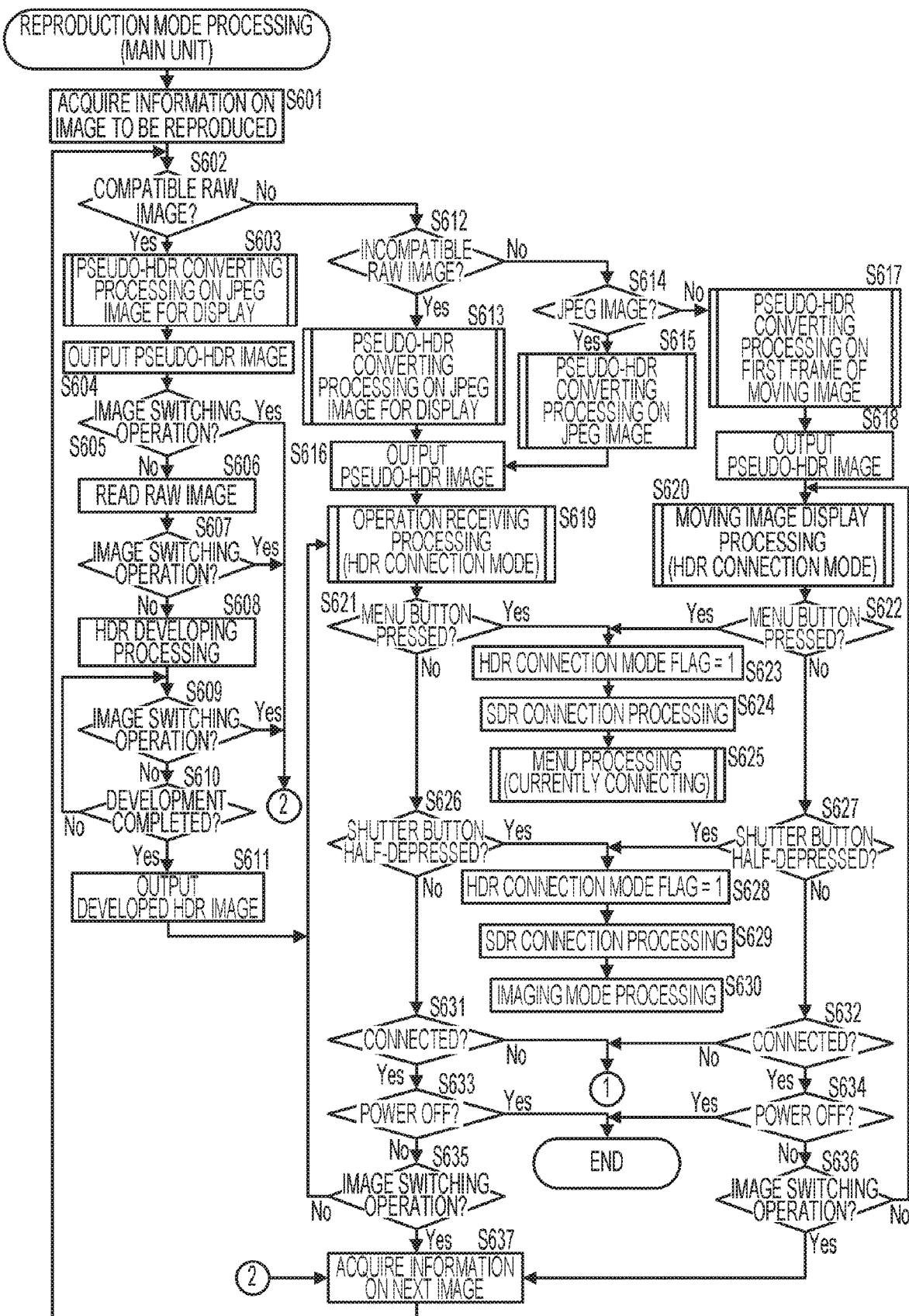
FIG. 6 is a flow chart of the digital camera according to the embodiment.

FIG. 6 is a flow chart depicting details of the reproduction mode processing in the case when connection in the HDR connection mode has been performed (S503 in FIG. 5A). This processing is implemented when the program recorded in the non-volatile memory 56 is developed in the system memory 52, and the system control unit 50 executes the program.

In S601, the system control unit 50 acquires information on an image to be reproduced (e.g. metadata, file name) from the file of this image.

In S602, based on the information acquired in S601 and the later mentioned S637 (e.g. metadata and file name of image to be reproduced), the system control unit 50 determines whether the image to be reproduced is a RAW image that can be developed by the digital camera 100 (compatible RAW image). Processing advances to S603 if it is determined that the image to be reproduced is a compatible RAW image, or to S612 if not. The compatible RAW image is a RAW image captured by the digital camera 100, for example. Based on the model information on the camera which captured this RAW image or the version information of the RAW image recorded in the attribute information of the RAW image file, it is determined that this RAW image is a compatible RAW image if this RAW image was captured by the same model as the digital camera 100. RAW images captured by other models may be determined as incompatible RAW images.

In S603, the system control unit 50 reads a JPEG image for display, which is recorded in association with the compatible RAW image to be reproduced, from the recording medium 200 to the memory 32 using the recording medium IF 18, and is converted into an HDR image by pseudo-HDR conversion processing, and is then written to the memory 32. In this embodiment, the pseudo-HDR conversion processing is processing to convert a JPEG image having an 8-bit gradation resolution (specific type image) into an HDR image having a 10-bit or 12-bit gradation resolution (pseudo-HDR image: converted image). For example, in BT. 2020, a 10-bit gradation resolution is specified as the gradation resolution of an HDR image. In some cases, a 12-bit gradation resolution is specified as the gradation resolution of an HDR image. The pseudo-HDR conversion processing will be described in detail later with reference to FIGS. 9A and 9B.

In S604, the system control unit 50 controls the output I/F 91, and outputs (supplies) the pseudo-HDR image stored in the memory 32 to the external apparatus 300 in digital signal format. Thereby the pseudo-HDR image written in the memory 32 in S603 is displayed on the external display unit 301 of the external apparatus 300 (HDR display). For example, a reproduction screen 1020 in FIG. 10 is displayed on the external display unit 301. The reproduction screen 1020 includes a pseudo-HDR image 1021, an icon 1022 which indicates that the HDR display is being performed, and an icon 1002 which indicates that the RAW image is being displayed. It takes time to develop a compatible RAW image, hence in this embodiment, the JPEG image for display, which is associated with this compatible RAW image, is converted into the pseudo-HDR image before displaying the HDR image generated by developing the compatible RAW image, and this pseudo-HDR image is displayed.

In S605, the system control unit 50 determines whether the image switching operation was performed using the operation unit 70. Processing advances to S637 if it is determined that the image switching operation was performed, or to S606 if not.

In S606, the system control unit 50 reads the compatible RAW image to be reproduced from the recording medium 200 to the memory 32 using the recording medium I/F 18.

In S607, the system control unit 50 determines whether the image switching operation was performed using the operation unit 70. Processing advances to S637 if it is determined that the image switching operation was performed, or to S608 if not.

In S608, the system control unit 50 starts the HDR generating processing (HDR developing processing) to generate an HDR image from the compatible RAW image which was read to the memory 32 in S606. In this embodiment, the HDR generating processing is developing processing (including color processing) to generate a developed HDR image from the RAW image using predetermined default parameters. The system control unit 50 writes the generated developed HDR image to the memory 32. Unlike the developing processing to develop a RAW image and generate an 8-bit SDR image (e.g. processing to generate a JPEG image from RAW image), the HDR developing processing is processing to generate a 10-bit HDR image.

In S609, the system control unit 50 determines whether the image switching operation was performed using the operation unit 70. Processing advances to S637 if it is determined that the image switching operation was performed, or to S610 if not.

In S610, the system control unit 50 determines whether the HDR developing processing started in S608 completed. Processing advances to S611 if it is determined that the developing processing completed, or to S609 if not.

In S611, the system control unit 50 outputs the developed HDR image stored in the memory 32 to the external apparatus 300. Thereby instead of the pseudo-HDR image displayed in S604, the developed HDR image generated in the HDR developing processing in S608 is displayed on the external display unit 301 of the external apparatus 300 (HDR display). For example, the reproduction screen 1030 in FIG. 10 is displayed on the external display unit 301. The reproduction screen 1030 includes a developed HDR image 1031, an icon 1002 which indicates that the RAW image is being displayed, and an icon 1022 which indicates that the HDR display is being performed.

When the pseudo-HDR image 1021 on the reproduction screen 1020 and the developed HDR image 1031 on the reproduction screen 1030 are compared in FIG. 10, the clouds in the sky, which is overexposed in the pseudo-HDR image 1021, are not overexposed, and gradation is expressed in the developed HDR image 1031. This is because the gradation resolution of the RAW image and the HDR image is higher than the gradation resolution of the SDR image, such as a JPEG image. In concrete terms, the gradation resolution of the JPEG image is low, hence overexposure is easily generated in the JPEG image. In the case of the pseudo-HDR image converted from a JPEG image as well, overexposure in the JPEG image remains, hence overexposure is easily generated. On the other hand, the gradation resolution of the RAW image and the HDR image is high, hence little overexposure is generated in the RAW image, and in the case of the developed HDR image generated by developing the RAW image as well, little overexposure is generated.

In S612, the system control unit 50 determines whether the image to be reproduced is a RAW image that is not supported in the developing processing of the digital camera 100 (incompatible RAW image), based on the information acquired in S601 and the later mentioned S637 (e.g. metadata and file name of image to be reproduced). Processing advances to S613 if it is determined that the image to be reproduced is an incompatible RAW image, or to S614 if not.

In S613, the system control unit 50 converts the JPEG image for display, which is recorded in association with the incompatible RAW image to be reproduced, into a pseudo-HDR image, similarly to S603.

In S614, the system control unit 50 determines whether the image to be reproduced is a JPEG image based on the information acquired in S601 and the later mentioned S637 (e.g. metadata and file name of image to be reproduced). Processing advances to S615 if it is determined that the image to be reproduced is a JPEG image, or to S617 if not. The JPEG image here is not a JPEG image for display which is included in the RAW file, but an image of an independent JPEG file.

In S615, the system control unit 50 reads the JPEG image to be reproduced from the recording medium 200 to the memory 32 using the recording medium I/F 18, and is converted into a pseudo-HDR image in the pseudo-HDR converting processing, which will be described later with reference to FIGS. 9A and 9B, and is then written to the memory 32.

In S616, the system control unit 50 outputs the pseudo-HDR image generated in S613 and S615 to the external apparatus 300, and displays the pseudo-HDR image (HDR display), similarly to S604. For example, if the image to be reproduced is an incompatible RAW image, a reproduction screen that is similar to the reproduction screen 1020 in FIG. 10 is displayed on the external display unit 301, and if the image to be reproduced is a JPEG image, the reproduction screen 1040 in FIG. 10 is displayed on the external display unit 301. Similarly to the reproduction screen 1020, the reproduction screen 1040 includes the pseudo-HDR image 1021, and the icon 1022 which indicates that the HDR display is being performed. The reproduction screen 1040, however, includes an icon 1012 which indicates that the JPEG image is being displayed, instead of the icon 1002 which indicates that the RAW image is being displayed. Unlike the case of the compatible RAW image, the pseudo-HDR image is not replaced with the compatible HDR image after this step.

In S617, the system control unit 50 reads the image of the first frame of the moving image to be reproduced from the recording medium 200 to the memory 32 using the recording medium I/F 18, and converts this image into a pseudo-HDR image in the pseudo-HDR converting processing, which will be described later, and then writes the pseudo-HDR image to the memory 32.

In S618, the system control unit 50 outputs the pseudo-HDR image generated in S617 to the external apparatus 300, and displays the pseudo-HDR image (HDR display), similarly to S604. For example, a moving image reproduction preparation screen that is similar to the moving image reproduction preparation screen 1850 in FIG. 18B is displayed.

In S619, the system control unit 50 performs the operation receiving processing. The operation receiving processing in the case when the digital camera 100 is connected to the external apparatus 300 in the HDR connection mode will be described in detail later with reference to FIG. 14B. In S620, the system control unit 50 performs moving image display processing. The moving image display processing, in the case when the digital camera 100 is connected to the external apparatus 300 in the HDR connection mode, will be described in detail later with reference to FIG. 8B.

In S621, the system control unit 50 determines whether the menu button 70e was pressed. Processing advances to S623 if it is determined that the menu button 70e was pressed, or to S626 if not. In S622 as well, the system control unit 50 determines whether the menu button 70e was pressed. Processing advances to S623 if it is determined that the menu button 70e was pressed, or to S627 if not.

In S623, the system control unit 50 sets the HDR connection mode flag to 1. When the HDR connection mode flag is set to 1, this means that the HDR connection mode was set immediately before the SDR connection mode is set, and that a temporary SDR connection is being performed. In S624, the system control unit 50 switches the currently set connection mode from the HDR connection mode to the SDR connection mode, and performs the external connection processing for connection in the SDR connection mode (SDR connection processing described in FIG. 5D). In S625, the system control unit 50 performs the menu processing. The menu processing, in the case when the digital camera 100 is connected to the external apparatus 300, will be described in detail later with reference to FIG. 7. In this way, the connection mode is automatically switched to the SDR connection mode when the state of the connection in the HDR connection mode shifts the menu screen which does not include the reproduced image (captured image).

In S626, the system control unit 50 determines whether the shutter button 61 was half-depressed. Processing advances to S628 if it is determined that the shutter button 61 was half-depressed, or to S631 if not. In S627 as well, the system control unit 50 determines whether the shutter button 61 was half-depressed. Processing advances to S628 if it is determined that the shutter button 61 was half-depressed, or to S632 if not.

In S628, the system control unit 50 sets the HDR connection mode flag to 1. In S629, the system control unit 50 switches the currently set connection mode from the HDR connection mode to the SDR connection mode, and performs the SDR connection processing (reconnection processing) described with reference to FIG. 5D. In S630, the system control unit 50 performs the imaging mode processing. For example, in the imaging mode processing, the system control unit 50 outputs an imaging standby screen 1300 in FIG. 13 to the external apparatus 300, and displays this screen. In the state when the imaging standby screen is displayed (imaging standby state), the system control unit 50 performs imaging in accordance with the imaging instruction. When imaging is performed, the output screen to the external apparatus 300 is automatically switched to an imaging confirming screen 1310 in FIG. 13. Thereby the display screen of the external display unit 301 is automatically switched to the imaging confirming screen 1310. In this way, when the state of connection in the HDR connection mode is switched to the imaging mode in the reproduction mode, the connection mode is automatically switched to the SDR connection mode. If the playback button 79 is pressed in the imaging mode and the mode is switched to the reproduction mode again when the HDR connection mode flag is 1, the SDR connection mode is switched back to the HDR mode, and the reproduced image is displayed.

In S631, the system control unit 50 determines whether the digital camera 100 is connected to the external apparatus 300. Processing advances to S402 in FIG. 4 if it is determined that the digital camera 100 and the external apparatus 300 are not connected, or to S633 if not. In S632 as well, the system control unit 50 determines whether the digital camera 100 is connected to the external apparatus 300. Processing advances to S402 in FIG. 4 if it is determined that the digital camera 100 and the external apparatus 300 are not connected, or to S634 if not.

In S633, the system control unit 50 determines whether power off was instructed. The reproduction mode processing ends if it is determined that power off was instructed, or processing advances to S635 if not. In S634 as well, the system control unit 50 determines whether power off was instructed. The reproduction mode processing ends if it is determined that power off was instructed, or processing advances to S636 if not.

In S635, the system control unit 50 determines whether the image switching operation was performed. Processing advances to S637 if it is determined that the image switching operation was performed, or to S619 if not. In S636 as well, the system control unit 50 determines whether the image switching operation was performed. Processing advances to S637 if it is determined that the image switching operation was performed, or to S620 if not.

In S637, the system control unit 50 acquires information on the image to be reproduced next (e.g. metadata, file name) from the file of this image, similarly to S601.

The above is the reproduction mode processing in the case of connection in the HDR connection mode. In the reproduction mode processing in the case of connection in the SDR connection mode, on the other hand, processing similar to FIG. 4 is performed. However, the processing corresponding to S401 and S403 is not performed, and processing is performed in which the "display unit 28" in the description in FIG. 4 is regarded as the "external display unit 301". Further, in the processing corresponding to S417, processing advances to S402 if it is determined that the digital camera 100 is not connected to the external apparatus 300, or to S420 if not. In the same manner, in the processing corresponding to S418, processing advances to S402 if it is determined that the digital camera 100 is not connected to the external apparatus 300, or to S421 if not. In other words, in the case of the connection in the SDR connection mode, the connection mode is not changed even if the screen shifts to the menu screen or if the mode is switched to the imaging mode.

Menu Processing

Figure 7:
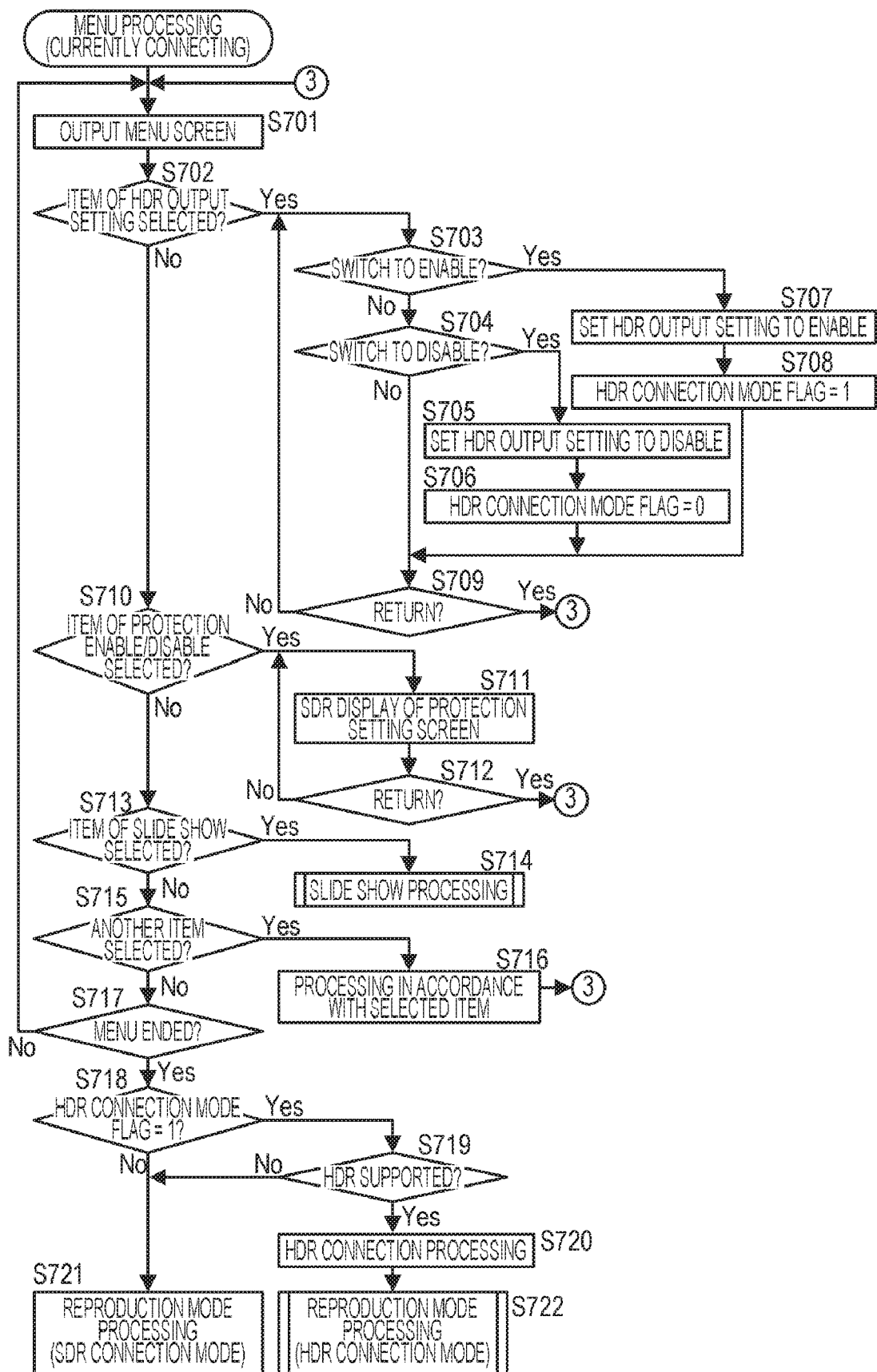
FIG. 7 is a flow chart of the digital camera according to the embodiment.

FIG. 7 is a flow chart depicting details of the menu processing (S625 in FIG. 6) in the case when the digital camera 100 is connected to the external apparatus 300. This processing is implemented when the program recorded in the non-volatile memory 56 is developed in the system memory 52, and the system control unit 50 executes the program.

Figure 11:
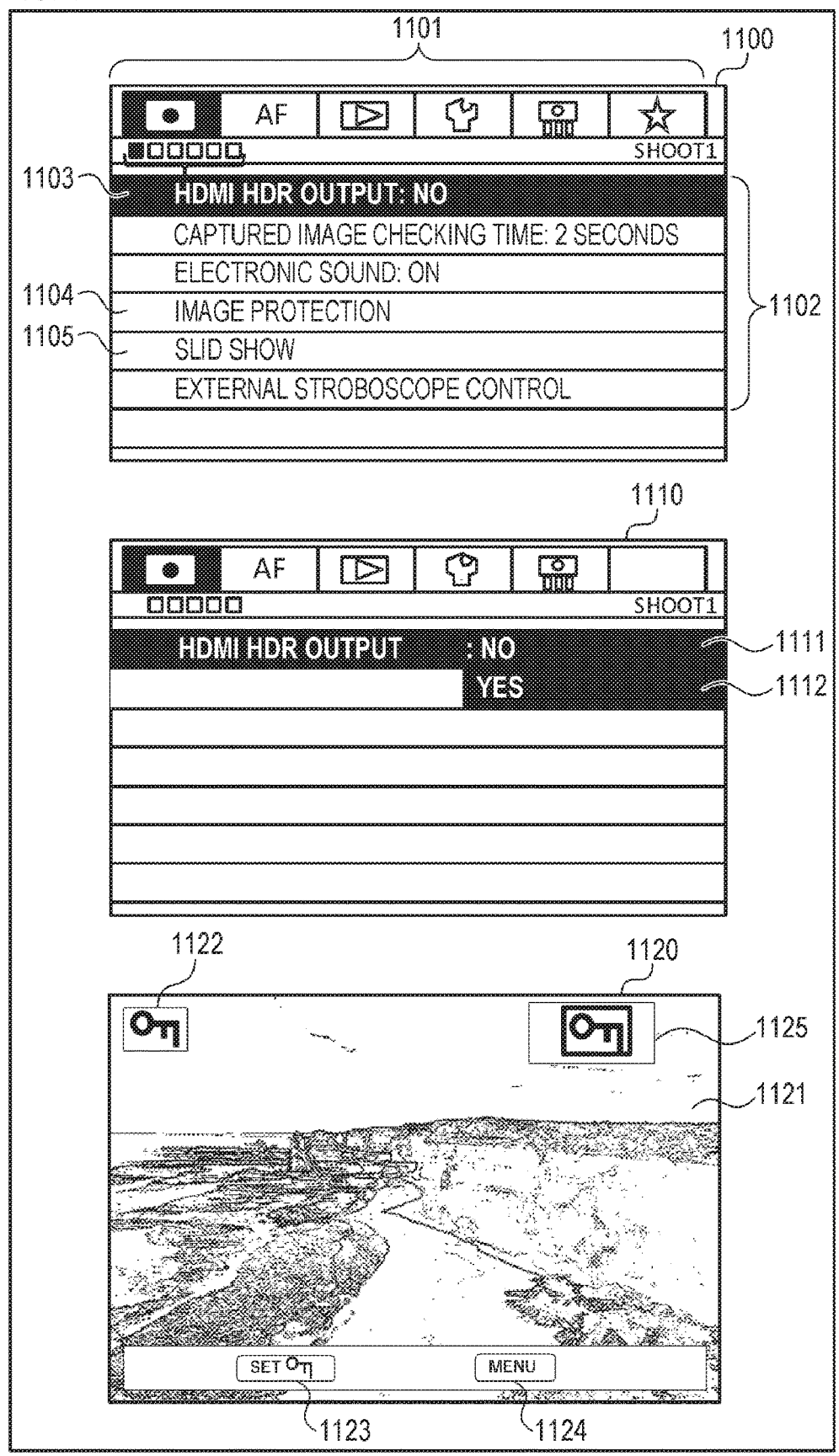
FIG. 11 is a screen example of the digital camera/external apparatus according to the embodiment.

In S701, the system control unit 50 outputs the menu screen to the external apparatus 300, and displays the menu screen. In the case of a screen that is not a natural image, such as a menu screen, bright white is often used as a color for characters, icons, background and the like. For example, the menu screen 1100 in FIG. 11 is displayed on the external display unit 301. The menu screen 1100 includes a plurality of menu tabs 1101 and a plurality of menu items 1102. The plurality of menu items 1102 includes the menu items 1103 to 1105. The menu item 1103 is a menu item to switch enable/disable of the HDR output setting. The menu item 1104 is a menu item to switch enable/disable of the image protection (attribute to disable a delete of the image for protection). The menu item 1105 is a menu item to instruct execution of slide show processing by which a plurality of images are sequentially displayed.

In S702, the system control unit 50 determines whether the user selected the menu item 1103 to switch enable/disable of the HDR output setting. Processing advances to S703 if it is determined that the menu item 1103 was selected, or to S710 if not. If the menu item 1103 is selected, the system control unit 50 switches the output screen to the external apparatus 300 from the menu screen outputted in S701 to a basic setting switching screen to switch enable/disable of the HDR output setting. For example, the output screen to the external apparatus 300 is switched from the menu screen 1100 in FIG. 11 to the setting screen 1110 of the HDR output setting, and the display on the external display unit 301 is switched. The setting screen 1110 of the HDR output setting is a screen of which type is the same as the menu screen 1100, but includes a selection item 1111 to disable the HDR output setting, and a selection item 1112 to enable the HDR output setting.

In S703, the system control unit 50 determines whether the user operation to switch the HDR output setting from disable ("NO") to enable ("YES") was performed. The user operation to switch the HDR output setting from disable to enable is selecting the selection item 1112 to enable the HDR output setting in the state where the HDR output setting is disabled. Processing advances to S707 if it is determined that this user operation was performed, or to S704 if not.

In S704, the system control unit 50 determines whether the user operation to switch the HDR output setting from enable ("YES") to disable ("NO") was performed. The user operation to switch the HDR output setting from enable to disable is selecting the selection item 1111 to disable the HDR output setting in the state where the HDR output setting is enabled. Processing advances to S705 if it is determined that this user operation was performed, or to S709 if not.

In S705, the system control unit 50 switches the HDR output setting from enable to disable, and records this setting value in the system memory 52. In S706, the system control unit 50 sets the HDR connection mode flag to 0.

In S707, the system control unit 50 switches the HDR output setting from disable to enable, and records this setting value in the system memory 52. In S708, the system control unit 50 sets the HDR connection mode flag to 1.

In S709, the system control unit 50 determines whether the user operation to return to the top menu screen from the setting screen of the HDR output setting, which was displayed when processing advances from S702 to S703, was performed.

Processing advances to S701 if it is determined that this user operation was performed, or to S703 if not.

In S710, the system control unit 50 determines whether the user selected the menu item 1104 to switch enable/disable of the image protection. Processing advances to S711 if it is determined that this menu item 1104 was selected, or to S713 if not.

In S711, the system control unit 50 switches the output screen to the external apparatus 300 from the menu screen outputted in S701 to a protection setting switching screen to switch enable/disable of image protection. For example, the output screen to the external apparatus 300 is switched from the menu screen 1100 in FIG. 11 to the protection setting switching screen 1120, and the display on the external display unit 301 is switched. The protection setting switching screen 1120 includes: a target image 1121 of which enable/disable of image protection is switched; and an icon 1122 which indicates that this screen is the protection setting switching screen. The protection setting switching screen 1120 also includes an icon 1123 which indicates that the operating member to switch enable/disable of the protection is the SET button 75. The protection setting switching screen 1120 includes an icon 1124 which indicates that the operating member to exit from the protection setting switching screen 1120 is the menu button 70e. Each time the SET button 75 is pressed, the system control unit 50 switches enable/disable of the image protection. If the image protection is enabled, the system control unit 50 changes the output screen, so that an icon 1125 which indicates that image protection is enabled is also displayed.

The image 1121 of the protection setting switching screen 1120 is an image reproduced immediately before the menu processing, an image selected from a plurality of images recorded on the recording medium 200 by another user operation or the like.

The image 1121 is displayed without switching the currently set connection mode from the SDR connection mode to the HDR connection mode, even if this is an image of the image file of a compatible RAW image. In other words, if the compatible RAW image is the target of setting the protection, JPEG for display, included in the RAW image file, is outputted in the SDR connection mode. In the menu processing, an image similar to the image 1121 may be displayed, for example, when the image selection is deleted, another attribute such as rating (degree of significance) to the image is added, an attribute of the image is changed, or image editing such as trimming is performed. In such a case as well, the image is displayed without switching the currently set connection mode to the HDR connection mode.

In S712, the system control unit 50 determines whether the user operation to return to the menu screen from the protection setting switching screen displayed in S711 (pressing the menu button 70e) was performed. Processing advances to S701 if it is determined that this user operation was performed, or to S711 if not.

In S713, the system control unit 50 determines whether the user selected the menu item 1105 to instruct execution of the slide show processing. Processing advances to S714 if it is determined that this menu item 1105 was selected, or to S715 if not.

In S714, the system control unit 50 performs the slide show processing. The slide show processing will be described in detail later with reference to FIGS. 16A, 16B and 17.

In S715, the system control unit 50 determines whether the user selected a menu item other than the menu items 1103 to 1105. Processing advances to S716 if it is determined that this menu item was selected, or to S717 if not.

In S716, the system control unit 50 performs the processing in accordance with the menu item selected in S715. For example, the image selection is detected, an attribute is added to the image, an attribute of the image is changed, the image is edited, the captured image confirming time is changed, enable/disable of the electronic sound output is switched, or an external stroboscope is controlled.

In S717, the system control unit 50 determines whether the user performed the menu processing end operation. Processing advances to S718 if it is determined that the menu processing end operation was performed, or to S701 if not.

In S718, the system control unit 50 determines whether the HDR connection mode flag is 1. Processing advances to S719 if it is determined that the HDR connection mode flag is 1, or to S721 if not.

In S719, similarly to S501 described above, the system control unit 50 determines whether the external apparatus 300 supports HDR. Processing advances to S720 if it is determined that the external apparatus 300 supports HDR, or to S721 if not.

In S720, the system control unit 50 switches the currently set connection mode from the SDR connection mode to the HDR connection mode, and performs the external connection processing for the connection in the HDR connection mode (HDR connection processing described above in FIG. 5C: reconnection processing).

In S721, the system control unit 50 performs the reproduction mode processing that is performed in the case of the connection in the SDR connection mode (modification of FIG. 4).

In S722, the system control unit 50 performs the reproduction mode processing that is performed in the case of the connection in the HDR connection mode (FIG. 6).

The above is the menu processing in the case when the digital camera 100 is connected to the external apparatus 300. Processing similar to FIG. 7 is performed even in the case when the digital camera 100 is not connected to the external apparatus 300. However, the processing corresponding to S718 to S722 is not performed, and processing is performed in which the "external display unit 301" in the description in FIG. 7 is regarded as the "display unit 28". If it is determined that the menu processing end operation was performed in the processing corresponding to S717, the system control unit 50 performs the reproduction mode processing in FIG. 4.

Moving Image Display Processing

Figure 8B:
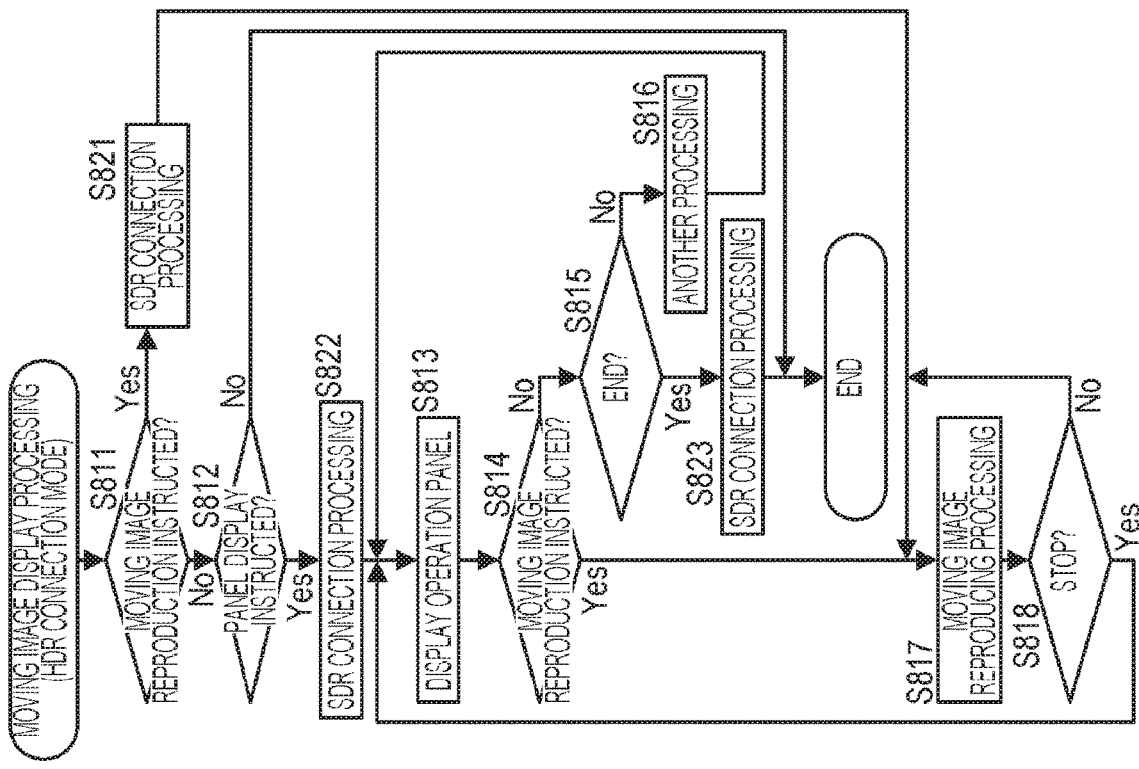
FIGS. 8A and 8B are flow charts of the digital camera according to the embodiment.
Figure 8A:
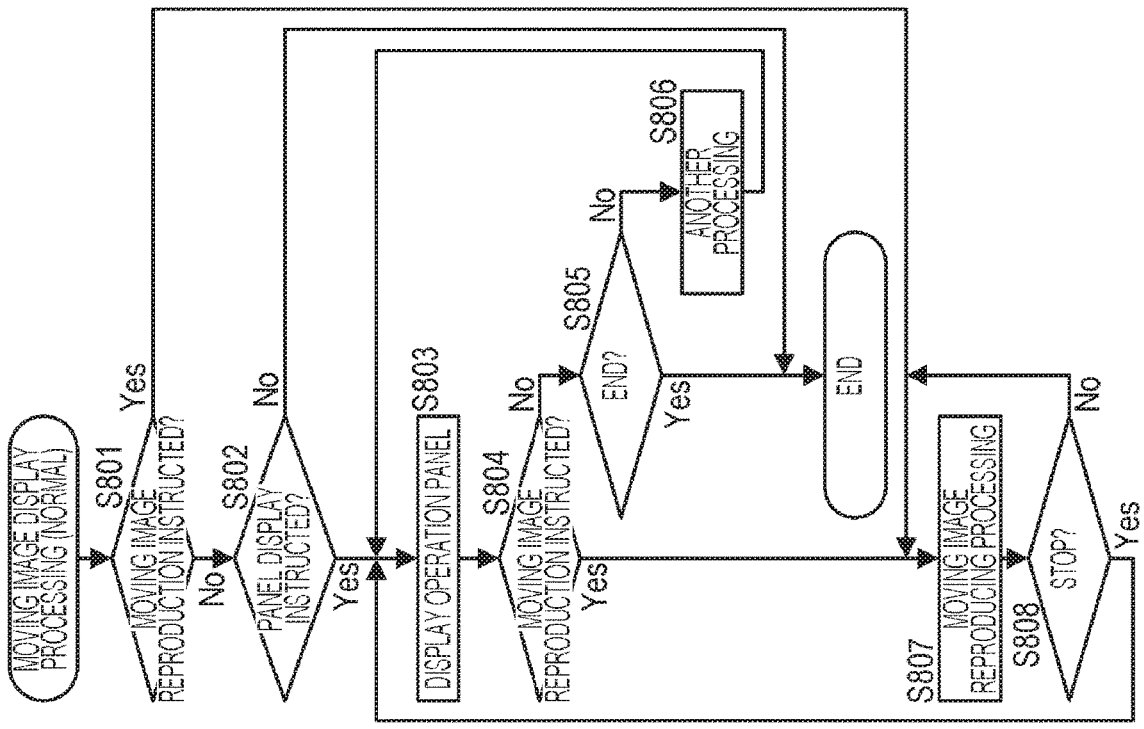

FIG. 8A is a flow chart depicting details of the moving image display processing (S410 in FIG. 4) in the case when the digital camera 100 is not connected to the external apparatus 300. This processing is implemented when the program recorded in the non-volatile memory 56 is developed in the system memory 52, and the system control unit 50 executes the program. When this processing is started, the moving image reproduction preparation screen 1850 in FIG. 18B is displayed on the display unit 28 (S408 in FIG. 4).

In S801, the system control unit 50 determines whether the user instructed to reproduce the moving image. Processing advances to S807 if the user instructed to reproduce the moving image, or to S802 if not.

In S802, the system control unit 50 determines whether the user instructed to display the operation panel for the moving image reproduction. Processing advances to S803 if the user instructed to display the operation panel, or the moving image display processing is ended if not.

Figure 12:
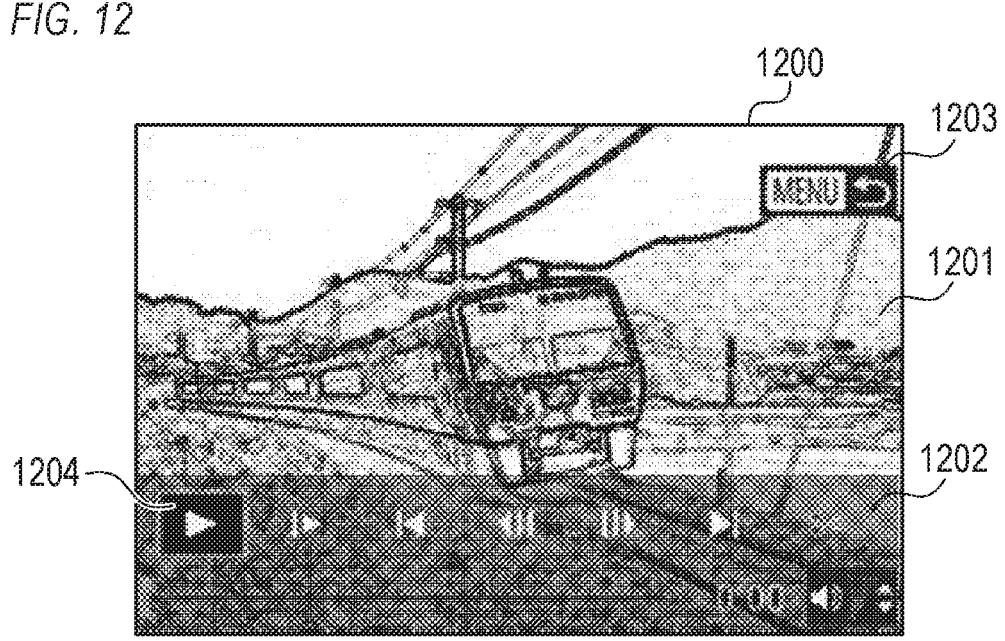
FIG. 12 is a screen example of the digital camera/external apparatus according to the embodiment.

In S803, the system control unit 50 displays the operation panel on the display unit 28. For example, the screen 1200 in FIG. 12 is displayed. The screen 1200 includes a frame 1201 of the reproduction target moving image, an operation panel 1202 for various user operations to reproduce moving images, and an icon 1203 which indicates a user operation to end the moving image display processing and return to the reproduction mode processing. When reproduction of the moving image is not started, the first frame of the moving image is displayed as a frame 1201, and during reproduction of the moving images, the frame displayed as the frame 1201 sequentially changes over time. The operation panel 1202 includes a reproduction button 1204 to instruct the start of reproduction of the moving image. The operation panel 1202 also includes a button to instruct frame forward, a button to instruct frame return, and a button to instruct slow reproduction. Further, the operation panel 1202 includes a button to shift to the editing mode, an indicator bar to express the time position of the currently displayed frame, and a button to instruct to adjust the sound volume. The icon 1203 indicates a user operation, to be performed to end the moving image display processing and return to the reproduction mode processing, activated by pressing the menu button 70e.

In S804, the system control unit 50 determines whether the user instructed to reproduce the moving image (e.g. selecting the reproduction button 1204). Processing advances to S807 if the user instructed to reproduce the moving image, or to S805 if not.

In S805, the system control unit 50 determines whether the user instructed to end the moving image display processing (e.g. pressing the menu button 70e). The moving image display processing ends if the user instructed to end the moving image display processing, or processing advances to S806 if not.

In S806, if another user operation is performed, the system control unit 50 performs processing in accordance with this user operation. For example, adjustment of the sound volume, frame forward, frame return, slow reproduction, and moving image editing during reproducing the moving image, may be performed.

In S807, the system control unit 50 performs the moving image reproduction processing. Thereby the progressing images of the moving image are displayed on the display unit 28.

In S808, the system control unit 50 determines whether the user instructed to stop the moving image reproduction. Processing returns to S803 if the user instructed to stop the moving image reproduction, or to S807 if not. When processing returns from S808 to S803, the system control unit 50 performs the processing to stop the moving image reproduction. Thereby the frame 1201 on the screen 1200 no longer changes.

Even in the moving image display processing when the connection is in the SDR connection mode, processing similar to FIG. 8A is performed. However, "display unit 28" in the description in FIG. 8A is regarded as "external display unit 301".

FIG. 8B is a flow chart depicting details of the moving image display processing (S620 in FIG. 6) in the case when the connection is in the HDR connection mode. This processing is implemented when the program recorded in the non-volatile memory 56 is developed in the system memory 52, and the system control unit 50 executes the program. Before this processing is started, a moving image reproduction preparation screen similar to the moving image reproduction preparation screen 1850 in FIG. 18B is displayed on the external display unit 301 (S618 in FIG. 6).

In S811, the system control unit 50 determines whether the user instructed to reproduce the moving image. Processing advances to S821 if the user instructed to reproduce the moving image, or to S812 if not.

In S821, the system control unit 50 switches the currently set connection mode from the HDR connection mode to the SDR connection mode, and performs the external connection processing for the connection in the SDR connection mode (SDR connection processing described above in FIG. 5D: reconnection processing). Then processing advances to S817, and the moving image reproduction processing is performed. Thereby progressing images of the moving image are outputted to the external apparatus 300, and displayed on the external display unit 301.

In S812, the system control unit 50 determines whether the user instructed to display the operation panel for the moving image reproduction. Processing advances to S822 if the user instructed to display the operation panel, or the moving image display processing is ended if not.

In S822, the system control unit 50 switches the currently set connection mode from the HDR connection mode to the SDR connection mode, and performs the external connection processing for the connection in the SDR connection mode (SDR connection processing described above in FIG. 5D; reconnection processing). Then processing returns to S813, where the operation panel is outputted to the external apparatus 300, and displayed on the external display unit 301.

The processing in S814 to S818 is similar to S804 to S808 described above, hence description thereof will be omitted. The output destination of the images here, however, is not the display unit 28 but the external apparatus 300.

Processing advances to S823 if it is determined that the end of the moving image display processing was instructed in S815 in the state where the operation panel for moving image reproduction is being outputted.

In S823, the system control unit 50 switches the currently set connection mode from the SDR connection mode to the HDR connection mode, and performs the external connection processing for the connection in the HDR connection mode (HDR connection processing described above in FIG. 5C; reconnection processing).

As described above, in the case of outputting images in the HDR connection mode, if a moving image is selected by the image switching operation, the image converted into a pseudo-HDR image in S618 is outputted as the representative image of the moving image which is displayed first after the image switching operation, without changing the HDR connection mode. Then in the case of switching to the next image without reproducing the moving image, the next image can be displayed without generating processing to switch the connection mode. Since the connection mode is not switched in the state of image forwarding (or image returning) where the user is continuously performing the image switching operation, the user can continuously switch images at a comfortable speed. On the other hand, if the user instructed to reproduce the moving image or to display the operation panel in the state where the representative image of the moving image, converted into the pseudo-HDR image, is being displayed, this may be a case in which the user is viewing the displayed moving image with interest. In this case, the connection mode is switched from the HDR connection mode to the SDR connection mode (reconnected), then the moving image is displayed. Thus the moving image recorded at SDR image quality can be displayed without conversion (pseudo-HDR conversion), although it takes time for the reconnection processing, hence the moving image can be viewed with accurate tinge precisely as recorded. When the viewing of the moving image ends, the connection mode is automatically returned to the original HDR connection mode in S823.

Figure 9A:
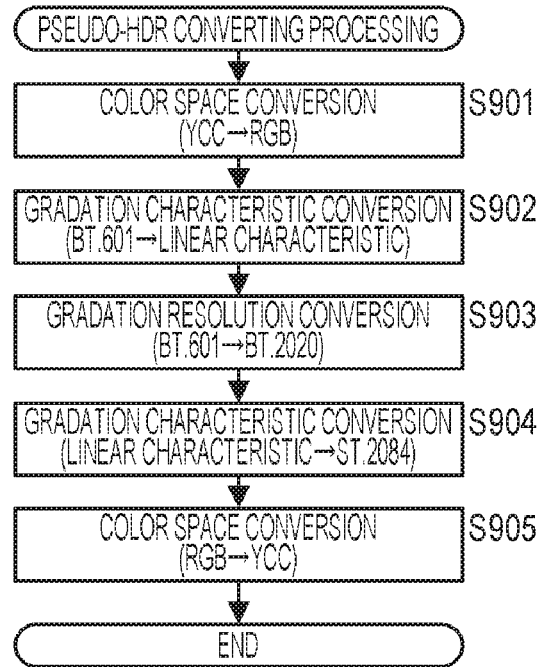
FIG. 9A is a flow chart of the digital camera according to the embodiment.

Pseudo-HDR Converting Processing FIG. 9A is a flow chart depicting details of the pseudo-HDR converting processing (S603, S613, S615 and S617 in FIG. 6). This processing is implemented when the program recorded in the non-volatile memory 56 is developed in the system memory 52, and the system control unit 50 executes the program. In the pseudo-HDR converting processing, the gradation resolution of the image is enhanced, and the gradation characteristic of the image (correspondence between the gradation value and brightness) is converted. In this embodiment, an example of converting an SDR image (e.g. JPEG image) with YCC 422 (BT. 601, BT. 601) into a pseudo-HDR image YCC 422 (ST. 2084, BT. 2020) by the pseudo-HDR converting processing will be described.

Here YCC (BT. 601, BT. 601) refers to the color space (gradation characteristic, gradation resolution)=YCC 422 (gradation characteristic specified in BT. 601, and gradation resolution specified in BT. 601). In the same manner, YCC 422 (ST 2084, BT 2020) refers to YCC 422 (gradation characteristic specified in ST. 2084, gradation resolution specified in BT. 2020). The same method of interpretation is applied to the other description herein below.

In S901, the system control unit 50 converts the color space of the SDR image with YCC 422 (BT. 601, BT 601) written in the memory 32 into RGB. Thereby the SDR image with YCC 422 (BT. 601, BT. 601) is converted into an image with RGB (BT. 601. BT. 601).

In S902, the system control unit 50 converts the gradation character of the image with RGB (BT 601, BT 601) acquired in S901 into a linear characteristic, in which brightness increases linearly with respect to the increase in the gradation value (γ conversion using a predetermined γ curve). Thereby the image with RGB (BT 601, BT 601) is converted into an image with RGB (linear characteristic, BT 601).

In S903, the system control unit 50 converts the gradation resolution of the image with RGB (linear characteristic, BT 601) acquired in S902 into the gradation resolution specified in BT 2020 (CG conversion). Thereby the image with RGB (linear characteristic, BT. 601) is converted into an image with RGB (linear characteristic, BT. 2020). If the gradation resolution of the image is increased from the gradation resolution specified in BT. 601 to the gradation resolution specified in BT 2020, the color gamut (range of colors that can be expressed) expands.

Figure 9B:
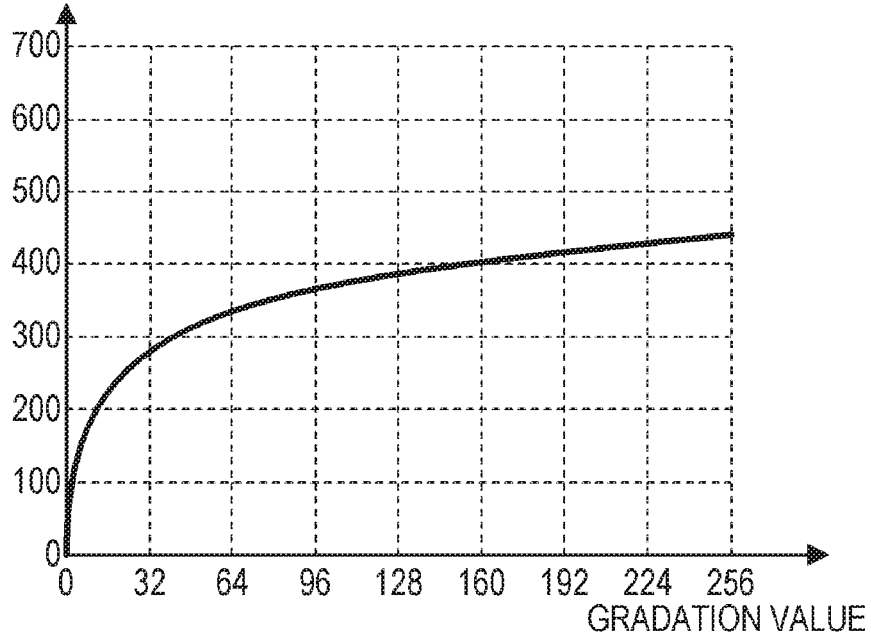
FIG. 9B is a graph indicating a γ curve according to the embodiment.

In S904, the system control unit 50 converts the gradation characteristic of the image with RGB (linear characteristic, BT 2020) acquired in S903 into the gradation characteristic specified in ST. 2084 (γ conversion using the γ curve in FIG. 9B). Thereby the image with RGB (linear characteristic, BT 2020) is converted into an image with RGB (ST. 2084, BT. 2020). The gradation characteristic specified in ST. 2084 is called "perceptual quantization" (PQ).

In S905, the system control unit 50 converts the color space of the image with RGB (ST. 2084, BT 2020) acquired in S904 into YCC 422. Thereby the image with RGB (ST. 2084, BT. 2020) is converted into a pseudo-HDR image with YCC 422 (ST. 2084, BT. 2020).

Summary of FIGS. 4 to 9A and 9B

According to this embodiment, in the case when the connection is not in the HDR connection mode, the image after the developing processing (which takes much time to display) is not displayed, but a JPEG image (which takes less time to display) is displayed (S406, S407 and S408 in FIG. 4). Even if connection is in the HDR connection mode, a pseudo-HDR image (which takes less time to display) is displayed (S604, S616 and S618 in FIG. 6). In the case of displaying a developed HDR image (which takes much time to display), the pseudo-HDR image is displayed, and then the developed HDR image is displayed instead of the pseudo-HDR image (S604 and S611 in FIG. 6). If an instruction to switch to the next image is received before completing processing such as the developing processing or RAW image reading processing, the current processing is interrupted, and processing to display the next image is performed (YES in S605, S607, and S609 in FIG. 6). Further, the switching of the connection mode causes a delay in the start of display, but the JPEG image is converted into the pseudo-HDR image and displayed while connection in the HDR connection mode is continued (maintained) (S616 and S618 in FIG. 6). Thereby various images are appropriately displayed. For example, various images can be displayed quickly or displayed with switching the connection mode. As a result, the user can view images appropriately (in comfort).

Further, if an instruction to switch the reproduction screen 1030 of the HDR display to the menu screen 1100, in which bright white is often used, is received, for example, as indicated in FIG. 13, the connection mode is switched to the SDR connection mode (S624 in FIG. 6). Thereby the glare that is generated on screen, in which bright white is often used, is suppressed, and each screen can be displayed in an appropriate connection mode.

Switching of the connection mode causes a delay in the start of display. Therefore in the case of the protection setting switching screen 1120, which is one of the screens selected in the menu items, this screen is displayed without being switched to the HDR connection mode, even if a captured image that can be displayed with HDR image quality (image of the compatible RAW image file) is included in the screen. Thereby in the operation flow, the generation of wait time, due to the switching of the connection mode, can be suppressed.

If HDR display is performed during image capturing, the display image and the captured image may become different. Therefore, as indicated in FIG. 13, the connection mode is switched to the SDR connection mode if an instruction to switch from the reproduction screen 1030 of the HDR display to the imaging standby screen 1300 is received (S629 in FIG. 6). Thereby the display image can be matched with the captured image, which improves user friendliness. Since display of the imaging confirming screen 1310 is also an SDR display, the generation of wait time due to the switching of the connection mode can be suppressed, and the user can comfortably check the imaging result and perform the next imaging.

Each time the reproduction screen 1030 of the HDR display is switched with the screen 1100, 1120, 1300 or 1310, the connection mode is switched. When the currently set connection mode is switched, the screen including an item (e.g. message) to notify that the currently set connection mode will be switched, may be displayed.

An example of outputting or displaying a captured image was described, but a computer graphic may be outputted or displayed instead. A connection mode that is different from the SDR connection mode and the HDR connection mode may be set. An image that is outputted in the SDR connection mode may not be a JPEG image, and the gradation resolution may not be an 8-bit gradation resolution. For example, an image having an 8-bit or less gradation resolution may be outputted in the SDR connection mode. The gradation resolution of an image that is outputted in the HDR connection mode may not be 10-bit or 12-bit. The HDR generating processing may include processing other than the developing processing, or may not include the developing processing. The type of image on which the HDR generating processing is performed may not be RAW. The pseudo-HDR conversion processing is not especially limited, as long as an image having a desired gradation resolution and desired gradation characteristic can be acquired. For example, the pseudo-HDR converting processing may not include the conversion of color space. A pseudo-HDR image having a gradation characteristic referred to as a hybrid log gamma (HLG) may be acquired. Various screens as well may not be those described above.

Operation Receiving Processing

FIG. 14A is a flow chart depicting details of the operation receiving processing (S409 in FIG. 4) in the case when the digital camera 100 is not connected to the external apparatus 300. This processing is implemented when the program recorded in the non-volatile memory 56 is developed in the system memory 52, and the system control unit 50 executes the program.

In S1401, the system control unit 50 determines whether the information button 70g was pressed. Processing advances to S1402 if it is determined that the information button 70g was pressed, or processing ends if not. In S1402, the system control unit 50 determines whether the imaging information (imaging setting information) is displayed on the display unit 28. Processing advances to S1403 if it is determined that the image information is displayed, or to S1404 if not. In S1403, the system control unit 50 determines whether the brightness histogram (histogram to indicate brightness distribution of an image) is displayed on the display unit 28. Processing advances to S1406 if it is determined that the brightness histogram is displayed, or to S1405 is not.

In S1404, the system control unit 50 displays the imaging information on the display unit 28. In S1405, the system control unit 50 displays the brightness histogram on the display unit 28. In S1406, the system control unit 50 controls such that the imaging information and the brightness histogram are not displayed.

Figure 15A:
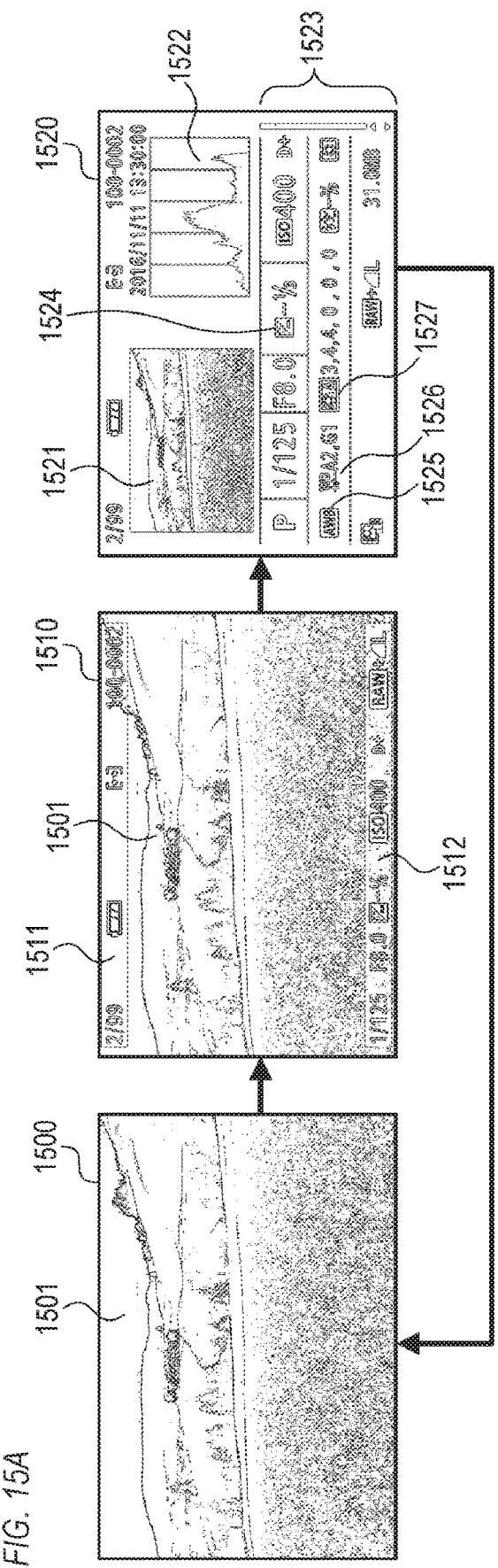
FIGS. 15A to 15C are screen examples of the digital camera/external apparatus according to the embodiment.

FIG. 15A indicates the transition of the display on the display unit 28 caused by pressing the information button 70g. If the information button 70g is pressed in a state where a screen 1500 that includes only an image (target image) 1501 is displayed on the display unit 28, the display on the display unit 28 shifts from the screen 1500 to a screen 1510 by the processing in S1404 in FIG. 14A. In the screen 1510, imaging information 1511 and imaging information 1512 of the image 1501 are superimposed at the top and bottom of the image 1501 respectively. If the information button 70g is pressed in a state where the screen 1510 is displayed on the display unit 28, the display on the display unit 28 shifts from the screen 1510 to a screen 1520 by the processing in S1405 in FIG. 14A. The screen 1520 includes an image 1521 generated by reducing the image 1501, and a brightness histogram 1522 of the image 1501 and imaging information 1523 of the image 1501. If the information button 70g is pressed in a state where the screen 1520 is displayed on the display unit 28, the display on the display unit 28 shifts from the screen 1520 to the screen 1500 by the processing in S1406 in FIG. 14A.

Between the imaging information 1512 of the screen 1510 and the imaging information 1523 of the screen 1520, it is assumed that the type and size of the information display items (items of information display) to be displayed are different. For example, the imaging information 1523 includes information 1524 on the exposure correction, information 1525 on the white balance setting, setting information 1526 to correct the white balance setting, and information 1527 on the picture style setting to set sharpness and contrast of the image. This information is not included in the imaging information 1512. The setting content of other setting items, histograms to indicate the distribution of RGB values of images, setting information of the color space of images and the like may be included in the screen.

Processing similar to FIG. 14A is performed as well in the operation receiving processing in the case of connection in the SDR connection mode. Here, however, the "display unit 28" in the description of FIG. 14A is regarded as the "external display unit 301".

FIG. 14B is a flow chart depicting details of the operation receiving processing (S619 in FIG. 6) in the case when the connection is in the HDR connection mode. This processing is implemented when the program recorded in the non-volatile memory 56 is developed in the system memory 52, and the system control unit 50 executes the program.

In S1411, the system control unit 50 determines whether the information button 70g was pressed. Processing advances to S1412 if it is determined that the information button 70g was pressed, or processing ends if not. In S1412, the system control unit 50 determines whether the imaging information is outputted to the external apparatus 300. Processing advances to S1414 if it is determined that the imaging information is outputted, or to S1413 if not. In S1413, the system control unit 50 outputs the imaging information to the external apparatus 300, and displays the imaging information. In S1414, the system control unit 50 controls such that the imaging information is not outputted.

Figure 15B:
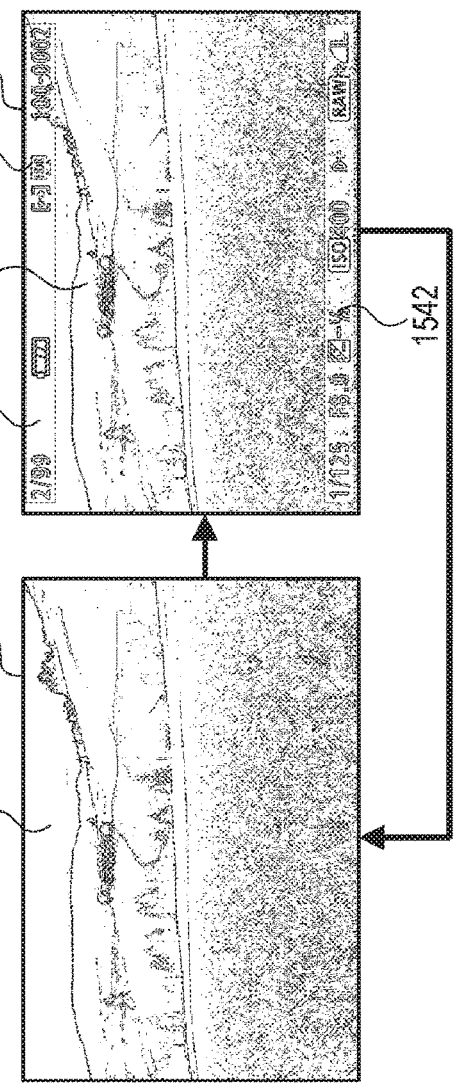

FIG. 15B indicates the transition of the display on the display unit 301 caused by pressing the information button 70g. If the information button 70g is pressed in a state when a screen 1530 which includes only an image 1531 is displayed on the external display unit 301, the display on the external display unit 301 shifts from the screen 1530 to a screen 1540 by the processing in S1413 in FIG. 14B. In the screen 1540, imaging information 1541 and imaging information 1542 of the image 1531 are superimposed at the top and bottom of the image 1531 respectively. Further, an icon 1543 which indicates that the HDR display (connection in the HDR connection mode) is being performed, is also displayed. If the information button 70g is pressed in a state where the screen 1540 is displayed on the external display unit 301, the display on the external display unit 301 shifts from the screen 1540 to the screen 1530 by the processing in S1414 in FIG. 14B.

In this way, in the case of the connection in the HDR connection mode, the system control unit 50 controls the screen transition so that the screen does not shift to a predetermined screen, as indicated in the screen 1520, in which the brightness histogram is displayed and the image is reduced, so that an area other than the image occupies a large part of the screen. Thereby the brightness histogram is no longer displayed when the connection is the HDR connection mode. As mentioned above, on the display unit 28, which is the main monitor of the digital camera 100, a JPEG for display, included in the RAW image file, is displayed with SDR image quality, even if this image is a compatible RAW image. The histogram displayed at this time is calculated based on image having SDR image quality displayed on the display unit 28.

On the other hand, if a histogram that is the same as the case of the main unit monitor is displayed when this compatible RAW image is developed to have HDR image quality and displayed with HDR image quality, the image viewed by the user on the external display unit 301 and the histogram do not accurately match. This is because the histogram on the main monitor is not the histogram calculated based on the displayed image having HDR image quality. For example, it is assumed that on the main monitor, the white portions are saturated and histogram has many maximum brightness values. Even in this case, when HDR image is displayed on the external display unit 301, there may be less white portions that are saturated and the image may be displayed with better gradations than the main monitor. In this case, the histogram having many maximum brightness values does not exactly match the appearance of the image on the external display unit 301, which causes discomfort to the user. On the other hand, if the histogram is calculated and displayed based on the HDR image generated by developing this compatible RAW image to have HDR image quality, then the histogram on the main unit monitor and the one on the external display unit 301 become different, even if these are histograms of the same image. This as well causes discomfort to the user. Therefore, in this embodiment, the histogram is not displayed when the image is being outputted in the HDR connection mode, so that the user does not refer to the histogram information while viewing the image with HDR image quality. As a consequence, the discomfort of the user, determination errors by the user on exposure and the like, and imaging setting errors by the user, for example, can be suppressed, and image capturing that is not intended by the user can be prevented.

Further, shift of the screen to a screen having a large non-image area (area that may be displayed in a single color, such as white), in which the image is reduced, is also suppressed, therefore glare on screen displayed as a single color, such as white, can be prevented.

In the case of the connection in the HDR connection mode, the screen may shift to a screen to display the detailed image information, such as screen 1520. However, it is preferable that information that causes the image to appear different between the SDR display and the HDR display (information display item related to at least one of brightness, gradation and tinge) is not displayed. For example, it is preferable not to display information on exposure correction, information on white balance setting, setting information to correct white balance setting, and information on picture style setting to set the sharpness and contrast of an image. It is also preferable not to display a histogram indicating the distribution of RGB values of an image and setting information on the color space of an image.

Figure 15C:
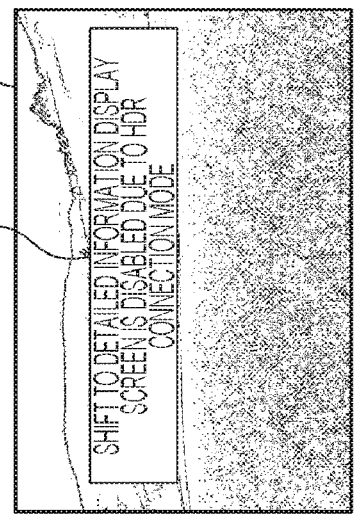

When the screen 1540 is shifted to the screen 1530, the system control unit 50 may temporarily output a screen 1550 which includes a guidance 1551 to notify that the shift to the screen to display the brightness histogram is disabled, and displays this screen 1550 on the external apparatus 300 (FIG. 15C). Further, after outputting the screen 1550 on the guidance 1551, the system control unit 50 may output a screen that includes a guidance to prompt the determination whether the HDR connection mode is cancelled and the SDR connection mode is set, and display this screen on the external apparatus 300. If an instruction to cancel the HDR connection mode is received, the system control unit 50 switches the currently set connection mode from the HDR connection mode to the SDR connection mode, and performs the SDR connection processing. When the SDR connection mode is set, the screen can be shifted to such as screen as the screen 1520. If processing to emphasize an image region having a brightness information that exceeds a predetermined threshold by a flashing display or the like (highlight warning display) can be performed, this highlight warning processing may be disabled when the image 1531 is displayed.

Slide Show Processing

Figure 16A:
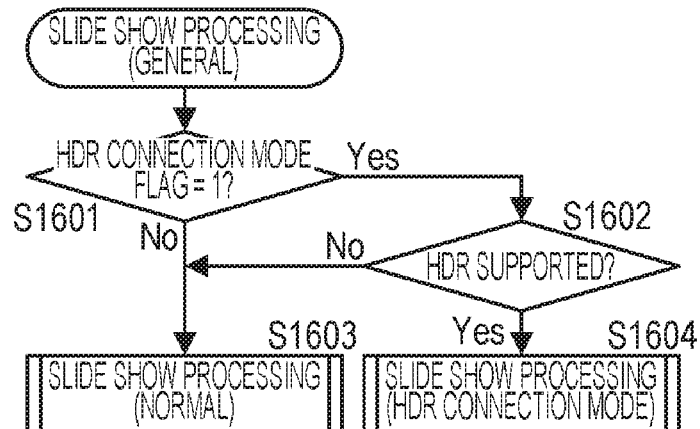
FIGS. 16A and 16B are flow charts of the digital camera according to the embodiment.

FIG. 16A is a flow chart depicting details of the slide show processing (S714 in FIG. 7). This processing is implemented when the program recorded in the non-volatile memory 56 is developed in the system memory 52, and the system control unit 50 executes the program.

In S1601, the system control unit 50 determines whether the HDR connection mode flag is set to 1. Processing advances to S1602 if the HDR connection mode flag is set to 1, or to S1603 if not. In S1602, the system control unit 50 determines whether the external apparatus 300 supports HDR, similarly to S501. Processing advances to S1604 if HDR is supported, or to S1603 if not. In S1603, the system control unit 50 executes the slide show processing in FIG. 16B. In S1604, the system control unit 50 executes the slide show processing in FIG. 17.

Figure 16B:
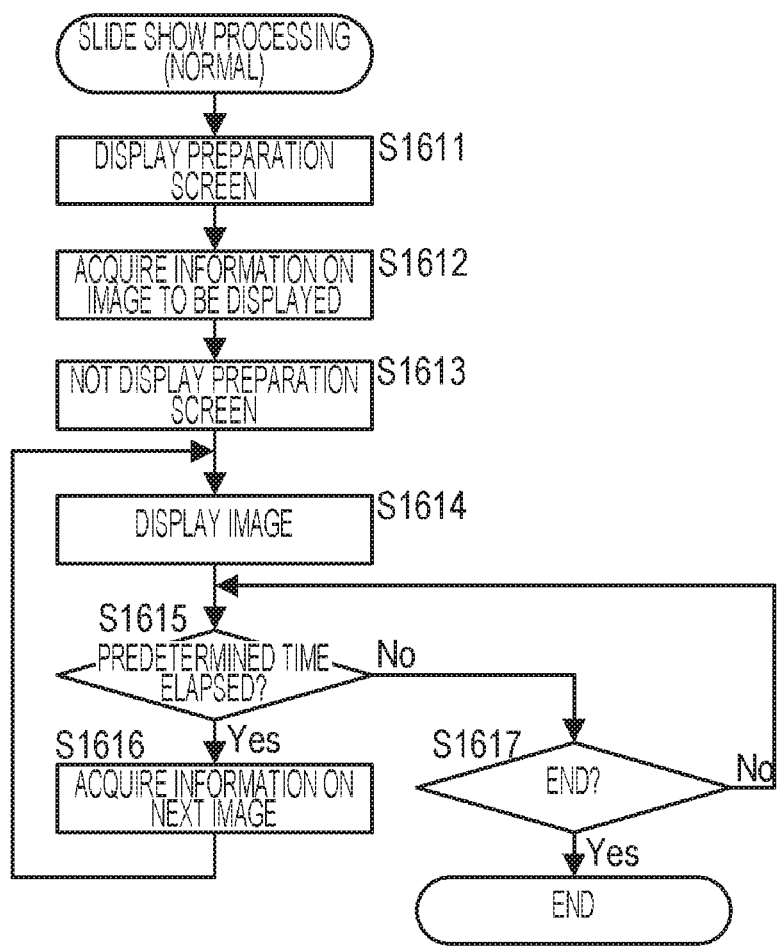

FIG. 16B is a flow chart depicting details of the slide show processing performed in S1603 in FIG. 16A. This processing is implemented when the program recorded in the non-volatile memory 56 is developed in the system memory 52, and the system control unit 50 executes the program. Various screens in the slide show processing in FIG. 16B are displayed on the display unit 28 if the digital camera 100 is not connected to the external apparatus 300, or on the external display unit 301 if the digital camera 100 is connected to the external apparatus 300 in the SDR connection mode.

Figure 18A:
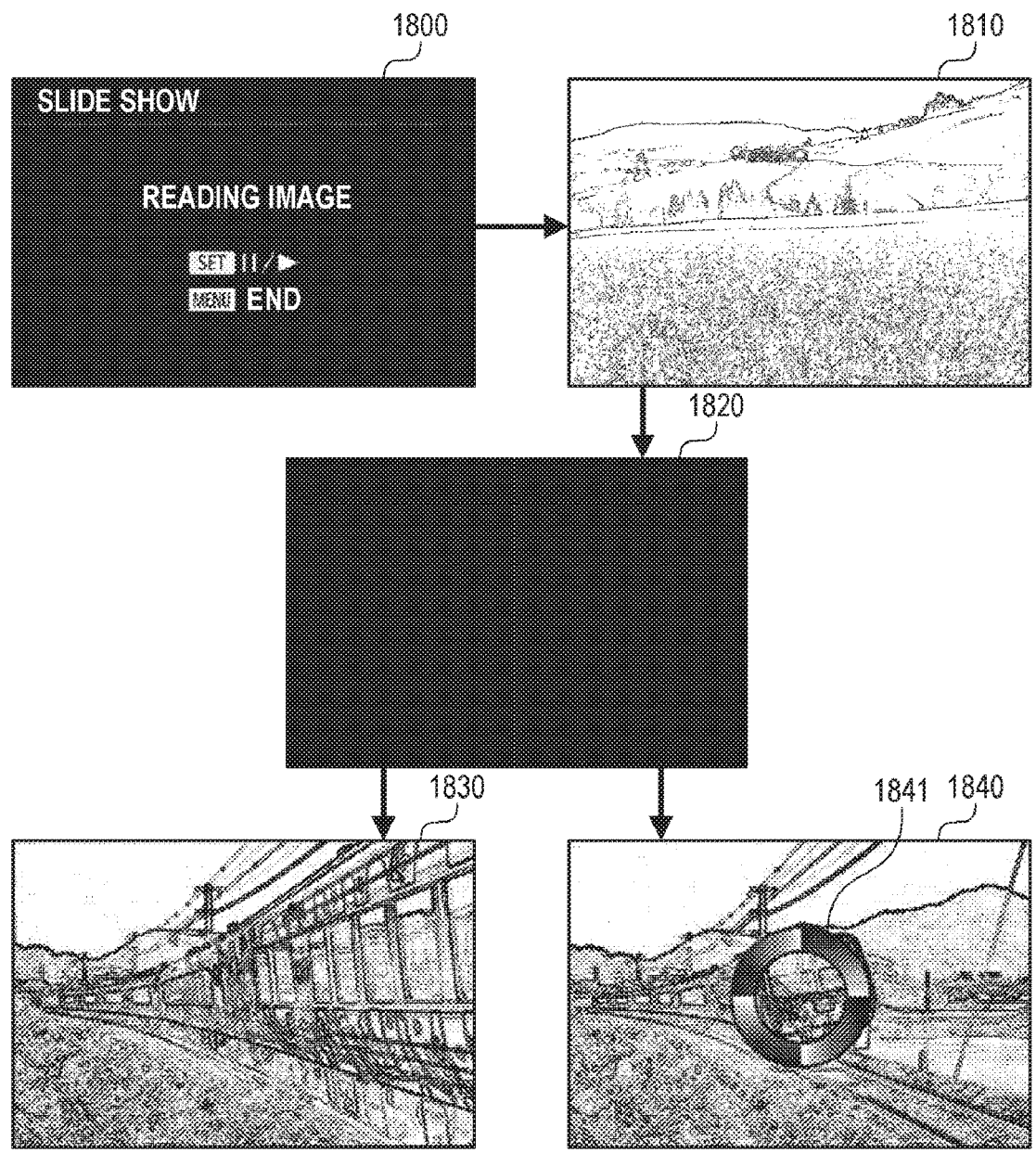
FIGS. 18A and 18B are screen examples of the digital camera/external apparatus according to the embodiment.
Figure 18B:
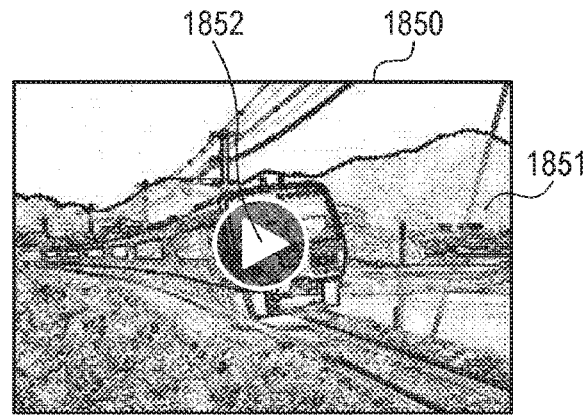

In S1611, the system control unit 50 displays a slide show start preparation screen 1800 indicated in FIG. 18A.

In S1612, the system control unit 50 acquires information on the image, that is displayed first in the slide show processing (e.g. metadata, file name), from the file of this image.

In S1613, the system control unit 50 stops display of the slide show start preparation screen.

In S1614, the system control unit 50 displays a display target image. The processing in S1614 is the same as the processing in S404 to S407 in FIG. 4 if the display target is the images of a still image file. If the display target is a moving image, processing the same as S807 in FIG. 8 is performed. Although description was omitted in FIG. 4, when an image is displayed, the system control unit 50 reads the image to be displayed (image data) from the recording medium 200, and develops the image in the memory 32. Then using the image processing unit 24, the system control unit 50 decodes and resizes the format size of the developed image to a format size that can be displayed on the display unit 28 and the external display unit 301. The processed image is stored in the memory 32.

In S1615, the system control unit 50 determines whether a predetermined time (switching interval), that is set in advance as a display time for each image in the slide show, has elapsed since the image was displayed in S1614. Processing advances to S1616 if it is determined that the predetermined time has elapsed, or to S1617 if not.

If the display target is a moving image, it is determined in the processing in S1615 whether the moving image was reproduced until the end or whether the image switching operation was performed, instead of determining whether the predetermined time has elapsed. Processing advances to S1616 if either the moving image was reproduced until the end or the image switching operation was performed, or to S1617 if not.

In S1616, the system control unit 50 acquires information of the image that is displayed next (e.g. metadata file name) from the file of this image.

In S1617, the system control unit 50 determines whether the slide show processing is ended. The system control unit 50 determines to end the slide show processing if the user instructed to end the slide show, or if display of all the images to be reproduced in the slide show processing completed, or determines not to end the slide show processing if not. The slide show processing ends if it is determined that the slide show processing is ended, or processing advances to S1615 if not.

Figure 17:
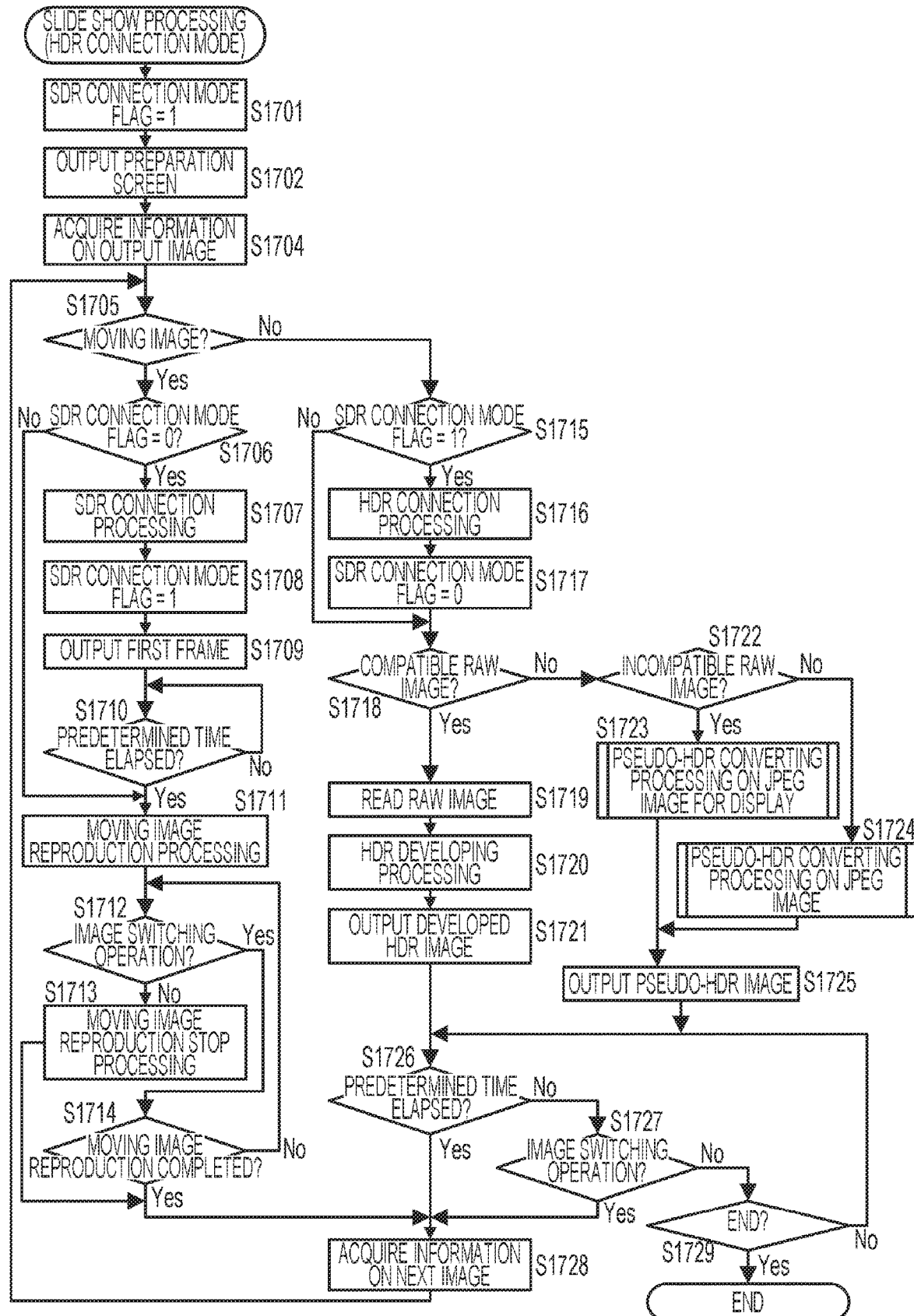
FIG. 17 is a flow chart of the digital camera according to the embodiment.

FIG. 17 is a flow chart depicting details of the slide show processing that is performed in S1604 in FIG. 16A. This processing is implemented when the program recorded in the non-volatile memory 56 is developed in the system memory 52, and the system control unit 50 executes the program.

In S1701, the system control unit 50 sets the SDR connection mode flag to 1. The SDR connection mode flag indicates whether the setting of the SDR connection mode is temporary.

In S1702, the system control unit 50 outputs the slide show start preparation screen to the external apparatus 300 via the output I/F 91. Thereby the slide show start preparation screen 1800 is displayed on the external display unit 301 as indicated in FIG. 18A.

In S1704, the system control unit 50 acquires information on an image that is displayed first in the slide show processing (e.g. metadata, file name) from the file of this image.

In S1705, the system control unit 50 determines whether the image to be outputted is a moving image based on the information acquired in S1704 and the later mentioned S1728 (e.g. metadata and file name of image to be outputted). Processing advances to S1706 if the image to be outputted is a moving image, or to S1715 if not.

In S1706, the system control unit 50 determines whether the SDR connection mode flag is set to 0. Processing advances to S1707 if the SDR connection mode flag is set to 0, or to S1711 if not.

In S1707, the system control unit 50 switches the currently set connection mode from the HDR connection mode to the SDR connection mode, that is, performs the SDR connection processing described in FIG. 5D. In S1708, the system control unit 50 sets the SDR connection mode flag to 1.

In S1709, the system control unit 50 reads the moving image to be outputted from the recording medium 200, and outputs the first frame (stopped image) of this moving image to the external apparatus 300, and displays this image.

In S1710, the system control unit 50 determines whether a predetermined time (time longer than the time estimated required for the SDR connection processing: at least 5 seconds) has elapsed since output of the first frame. The predetermined time here is unrelated to the above mentioned switching interval (time that is set in advance as a display time for each image in the slide show), and is set independently from the above mentioned switching time. Further, the predetermined time here is longer than at least the time for one frame of the frame rate (1/30 seconds if the frame rate is 30 fps) in the case of outputting the progressing images of a moving image. The predetermined time here is at least 0.3 seconds. Processing advances to S1711 if it is determined that the predetermined time has elapsed, or to S1710 if not. In the case when a plurality of moving images are outputted continuously, the determination result in S1706 becomes NO for the second and later moving images, hence the processing in S1709 (output of stopped image) and S1710 (standby for a predetermined time) is omitted.

In S1711, the system control unit 50 performs the moving image reproduction processing from the first frame. Thereby the progressing images of the moving image are outputted to the external apparatus 300, and are displayed.

In S1712, the system control unit 50 determines whether the user performed the image switching operation. Processing advances to S1713 if it is determined that the image switching operation was performed, or to S1714 if not.

In S1713, the system control unit 50 performs the processing to stop the moving image reproduction.

In S1714, the system control unit 50 determines whether the moving image was reproduced until the end (until the last frame). Processing advances to S1728 if it is determined that the moving image was reproduced until the end, or to S1712 if not.

If the image to be outputted is a still image, on the other hand, the system control unit 50 determines in S1715 whether the SDR connection mode flag is set to 1. Processing advances to S1716 if the SDR connection mode flag is set to 1, or to S1718 if not.

In S1716, the system control unit 50 performs the HDR connection processing described in FIG. 5C, to switch the currently set connection mode from the SDR connection mode to the HDR connection mode. In S1717, the system control unit 50 sets the SDR connection mode flag to 0.

In S1718, the system control unit 50 determines whether the image to be outputted is a compatible RAW image based on the information acquired in S1704 and the later mentioned S1728 (e.g. metadata and file name of image to be outputted). Processing advances to S1719 if it is determined that the image to be outputted is a compatible RAW image, or to S1722 if not.

In S1719, the system control unit 50 reads the compatible RAW image to be outputted from the recording medium 200, and develops this image in the system memory 32. In S1720, the system control unit 50 performs the HDR developing processing to generate a developed HDR image from the compatible RAW image developed in the system memory 32 in S1719. In S1721, the system control unit 50 outputs the developed HDR image generated in S1720 to the external apparatus 300, and displays the image.

In S1722, the system control unit 50 determines whether the image to be outputted is an incompatible RAW image based on the information acquired in S1704 and the later mentioned S1728 (e.g. metadata and file name of image to be outputted). Processing advances to S1723 if it is determined that the image to be outputted is an incompatible RAW image, or to S1724 if not.

In S1723, the system control unit 50 converts a JPEG image for display, which was recorded in association with the incompatible RAW image to be outputted, into a pseudo-HDR image. In S1724, the system control unit 50 converts the JPEG image to be outputted into a pseudo-HDR image (processing described above in FIG. 9A). The JPEG image in S1724 is not a JPEG image for display included in the RAW file, but an image in an independent JPEG file. In S1725, the system control unit 50 outputs the pseudo-HDR image generated in S1723 or S1724 to the external apparatus 300, and displays the pseudo-HDR image.

In S1726, the system control unit 50 determines whether a predetermined time (switching interval which is set in advance as a display time for each image in the slide show) has elapsed since the output of the image in S1721 or S1725. Processing advances to S1728 if it is determined that the predetermined time has elapsed, or to S1727 if not. It is irrelevant whether the predetermined time in S1726 and the predetermined time in S1710 are the same or different.

In S1727, the system control unit 50 determines whether the user performed the image switching operation. Processing advances to S1728 if it is determined that the image switching operation was performed, or to S1729 if not.

In S1728, the system control unit 50 acquires information on the image to be outputted next (e.g. metadata, file name) from the file of this image.

In S1729, the system control unit 50 determines whether the slide show processing is ended. The slide show processing ends if it is determined that the slide show processing is ended, or processing advances to S1726 if not.

FIG. 18A indicates a transition example of the screens in the slide show processing in FIG. 17.

First the slide show start preparation screen 1800 is displayed on the external display unit 301 by the processing in S1702 in FIG. 17. While the slide show start preparation screen 1800 is displayed, the information acquisition in S1704 is performed.

If the first output image is any one of a compatible RAW image, an incompatible RAW image, and a JPEG image, the connection is switched to the HDR connection mode. Then by the processing in S1721 or S1725, the screen 1810 of one of these images is displayed on the external display unit 301 in the HDR connection mode (HDR display). In this case, the SDR connection mode flag is 0. In this state, the image is switched to the next image by the image switching operation or when a predetermined time elapses, and if the next image is a moving image, the SDR connection processing is performed in S1707.

While performing the SDR connection processing in S1707, the output of the image is stopped so that display during switching of the connection mode is not seen, and the display screen of the external display unit 301 shifts from the screen 1810 to the screen 1820.

Here it is assumed that the moving image reproducing processing (output of progressing images) in S1711 is performed immediately. In this case, the progressing images may be outputted from the digital camera 100 before the external display unit 301 completes preparation for display. If the progressing images are outputted before the preparation completes, the initial portion of the moving image is not displayed on the external display unit 301, and the moving image is displayed on the external display unit 301 from the middle of the moving image as indicated in the screen 1830, hence the user cannot see the initial portion.

Therefore in this embodiment, the digital camera 100 outputs the first frame (stopped image) of the moving image after the SDR connection processing, and starts the moving image reproducing processing after a predetermined time elapses. Thereby the user can view the moving image from the beginning as indicated in the screen 1840.

The screen 1840 is a screen of the stopped image. The screen 1840 includes an item 1841 that indicates that the moving image reproducing processing is automatically performed after a predetermined time elapses.

If an item to instruct the start of reproduction of the moving image (item 1852 in FIG. 18B) is included in the screen of the stopped image, the user may misunderstand that the progressing images will not be displayed unless some operation is performed. Therefore it is preferable not to include such an item in the stopped image.

However, in some cases, preparation for the external display unit 301 to perform display may complete before the moving image reproducing processing is automatically performed. Therefore it is preferable that the system control unit 50 starts output of the progressing images in accordance with a predetermined user operation (e.g. moving image reproducing instruction) that is received in a predetermined period after the output of the stopped image. Thereby the user can view the progressing images without waiting until the predetermined time elapses after the output of the stopped image, which improves user friendliness.

Summary of FIGS. 16A, 16B and 17

According to this embodiment, in the case when the currently set connection mode is switched from the HDR connection mode to the SDR connection mode to reproduce the moving image, the stopped image of the moving image is outputted during this switching. Then the progressing images of the moving image are automatically outputted when a predetermined time elapses after the start of the output of the stopped image. Thereby when the currently set connection mode is switched from the HDR connection mode to the SDR connection mode to reproduce the moving image, it can be avoided that the output of the progressing images is started before the external display unit 301 completes preparation for the display and the initial portion of the moving image is not displayed. As a result, the user can view the moving image from the initial portion. This method of reproducing a moving image can also be applied to the moving image display processing in FIG. 8B. In other words, after S821 in FIG. 8B, the processing in S1709 and S1710 in FIG. 17 may be performed before performing the processing in S817.

The above mentioned processing may be performed not only for switching the SDR connection mode and the HDR connection mode, but also for switching the connection mode required for other reasons. For example, if it is necessary to change the connection to a connection mode of which image size (resolution) is different, or a connection mode of which frame rate is different when a reproduction of a moving image is started, the processing in S1709 and 1710 in FIG. 17 may be performed before outputting the progressing images of the moving image. For example, if reproduction of a moving image having a 4K image quality (4K resolution, that is, a resolution of about 4000 horizontal×2000 vertical) is instructed, in a state where the connection mode is for outputting an image having a 2K full HD image quality, processing to change the connection to the connection mode for 4K image quality is expected to be performed. In this case, if the processing in S1709 and S1710 in FIG. 17 is performed before starting the output of the progressing images of the moving image, then it can be prevented that the user will not see the initial portion of the moving image having 4K image quality. In the same manner, if reproduction of a moving image recorded at a 60p frame rate is instructed when the connection mode is for outputting an image having a 24p frame rate, processing to change the connection to the connection mode for 60p is expected to be performed. In this case, if the processing in S1709 and S1710 in FIG. 17 is performed before starting the output of the progressing images of the moving image, it can be prevented that the user will not see the initial portion of the moving image at 60p.

The various controls described above that are assumed to be performed by the system control unit 50 may be performed by one hardware unit, or may be distributed to a plurality of hardware (e.g. a plurality of processors and circuits) playing respective roles to control the entire apparatus.

The present invention has been described using preferred embodiments, but the present invention is not limited to these specific embodiments, but various modes within the scope that does not depart from the essence of the invention are also included in the present invention. Further, each embodiment described above is merely an example, and each embodiment may be combined as required.

In the embodiments described above, the present invention is applied to the digital camera (imaging apparatus), but the present invention is not limited to this example, but may be applied to any electronic apparatus that can output an image to an external apparatus. For example, the present invention can be applied to a personal computer, a PDA, a portable telephone terminal, a portable image viewer, a printer, a digital photo frame, a music player, a game machine, an electronic book reader, an image player, a display apparatus (including a projection apparatus), a tablet terminal, a smartphone, a home electronic appliance, and an onboard vehicle unit.

The present invention can be applied not only to an imaging apparatus main unit, but also to a control apparatus which communicates with an imaging apparatus (including a network camera) via a cable or wireless communication, and remotely controls the imaging apparatus. Examples of an apparatus that remotely controls the imaging apparatus include: a smartphone, a tablet PC and a desktop PC. The imaging apparatus can be remotely controlled by the control apparatus notifying commands to perform various operations and settings to the imaging apparatus based on the operations and processing performed at the control apparatus side. The live-view images captured by the imaging apparatus may be received and displayed on the control apparatus side via a cable or wireless communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the above embodiments, the following configurations are disclosed.

(1) An electronic apparatus, comprising:
    a connecting unit (connector) configured to connect with an external apparatus;
    a setting unit configured to set a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted; and a control unit configured to control so that in a case where the connection is in the second connection mode and an instruction to switch a first screen including a captured image captured by an imaging unit (image sensor) to a second screen not including a captured image is received, the set connection mode is switched from the second connection mode to the first connection mode, and the second screen is outputted from the connecting unit.

(2) The electronic apparatus according to (1), wherein in a case where an instruction to switch the second screen, which was outputted by switching the set connection mode from the second connection mode to the first connection mode, to the first screen is received, the control unit controls so that the set connection mode is switched from the first connection mode to the second connection mode and the first screen is outputted from the connecting unit.

(3) The electronic apparatus according to (1) or (2), wherein the second screen is a menu screen including a plurality of menu items, and in a case where an instruction to select a specific menu item on the second screen, which was outputted by switching the set connection mode from the second connection mode to the first connection mode is received, the control unit controls so that a screen, which relates to the specific menu item and includes the captured image, is outputted from the connecting unit without changing the set connection mode from the first connection mode.

(4) The electronic apparatus according to any one of (1) to (3), further comprising a converting unit configured to convert a specific type of image having the first gradation resolution into a converted image generated by converting a gradation resolution to a second gradation resolution which is higher than the first gradation resolution and converting a gradation characteristic, wherein in a case where the connection is in the second connection mode, the control unit controls so that the specific type of image is converted by the converting unit and outputted when the first screen including the specific type of image is outputted from the connecting unit.

(5) The electronic apparatus according to (4), wherein the specific type of image is a JPEG image.

(6) The electronic apparatus according to (4) or (5), wherein the second gradation resolution is 10-bit or 12-bit gradation resolution.

(7) The electronic apparatus according to any one of (1) to (6), wherein the first gradation resolution is 8-bit gradation resolution.

(8) The electronic apparatus according to any one of (1) to (7), wherein in a case where the set connection mode is switched from the second connection mode to the first connection mode, the control unit controls so that a screen including an item to notify that the set connection mode is switched is outputted from the connecting unit.

(9) An electronic apparatus, comprising:

a connecting unit configured to connect with an external apparatus;

a setting unit configured to set a connection mode with the external apparatus to any of a plurality of connection modes, including a first connection mode in which an image having a gradation resolution which is not higher than a predetermined gradation resolution is outputted, and a second connection mode in which an image having a gradation resolution which is higher than the predetermined gradation resolution is outputted; and a control unit configured to control so that in a case where the connection is in the second connection mode and an instruction to switch a first screen including a reproduced image to a third screen to perform imaging is received, the set connection mode is switched from the second connection mode to the first connection mode and the third screen is outputted from the connecting unit.

(10) The electronic apparatus according to (9), wherein the third screen is a screen including a live-view image captured by an imaging unit.

(11) The electronic apparatus according to (9) or (10), wherein the third screen is a screen on which imaging setting information on imaging by the imaging unit is displayed.

(12) The electronic apparatus according to any one of (9) to (11), wherein the control unit controls so that the imaging is performed in a case where an imaging instruction is received in a state where the set connection mode is switched from the second connection mode to the first connection mode and the third screen is being outputted from the connecting unit, and the first connection mode is continued in a case where the screen is automatically switched to a fourth screen which is a screen to confirm a captured image acquired by this imaging and includes a reproduced image.

(13) The electronic apparatus according to (12), wherein the fourth screen is a screen to confirm the captured image acquired by a previous imaging.

(14) The electronic apparatus according to (13), wherein the fourth screen is a quick review screen.

(15) The electronic apparatus according to any one of (9) to (14), wherein in a case where a user operation to switch the screen to the first screen is received in a state where the set connection mode is switched from the second connection mode to the first connection mode, the control unit controls so that the set connection mode is returned to the second connection mode when the screen is switched to the first screen.

(16) The electronic apparatus according to any one of (9) to (15), wherein the first screen is a reproduction screen in a reproduction mode, and the third screen is an imaging standby screen in a imaging mode.

(17) A control method for an electronic apparatus, comprising:

a connecting step of connecting with an external apparatus;

a setting step of setting a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted; and a control step of controlling so that in a case where the connection is in the second connection mode and an instruction to switch a first screen including a captured image captured by an imaging unit to a second screen not including a captured image is received, the set connection mode is switched from the second connection mode to the first connection mode, and the second screen is outputted to the external apparatus.

(18) A control method for an electronic apparatus, comprising:
a connecting step of connecting with an external apparatus;
a setting step of setting a connection mode with the external apparatus to any of a plurality of connection modes, including a first connection mode in which an image having a gradation resolution which is not higher than a predetermined gradation resolution is outputted, and a second connection mode in which an image having a gradation resolution which is higher than the predetermined gradation resolution is outputted; and
a control step of controlling so that in a case where the connection is in the second connection mode and an instruction to switch a first screen including a reproduced image to a third screen to perform imaging is received, the set connection mode is switched from the second connection mode to the first connection mode and the third screen is outputted to the external apparatus.

(19) A program that causes a computer to function as each unit of the electronic apparatus according to any one of (1) to (16).

(20) A computer readable medium storing a program that causes a computer to function as each unit of the electronic apparatus according to any one of (1) to (16).

(21) An electronic apparatus, comprising:
a converting unit configured to convert a first type of image having a first gradation resolution to a converted image generated by converting a gradation resolution into a second gradation resolution which is higher than the first gradation resolution and converting a gradation characteristic;
a generating unit configured to generate an image having the second gradation resolution, from a second type of image having a gradation resolution which is higher than the first gradation resolution;
a connecting unit configured to connect with an external apparatus; and
a control unit configured to control so that, in a case where an image based on the second type of image is outputted, a converted image having the second gradation resolution and generated by converting, by the converting unit, an accompanying image, which is an image having the first gradation resolution recorded in association with the second type of image, is outputted from the connecting unit, and then, instead of the converted image, an image having the second gradation resolution and generated from the second type of image by the generating unit, is outputted from the connecting unit.

(22) The electronic apparatus according to (21),
further comprising an instructing unit configured to perform a switching instruction of an image to be outputted from the connecting unit,
wherein in a case where the switching instruction is received after the converted image generated by converting the accompanying image is outputted and before the generating unit completes processing of the second type of image, the control unit controls so that the processing of the second type of image by the generating unit is interrupted, and processing to output a switched image in accordance with the switching instruction from the connecting unit is performed.

(23) The electronic apparatus according to (21) or (22).
wherein in a case where a switching instruction of an image to be outputted from the connecting unit is received after the converted image generated by converting the accompanying image is outputted and before reading of the second type of image for processing of the generating unit completes, the control unit controls so that the reading of the second type of image is interrupted, and processing to output a switched image in accordance with the switching instruction from the connecting unit is performed.

(24) The electronic apparatus according to any one of (21) to (23), wherein regarding the second type of image, in a case where processing to output an image having the second gradation resolution and generated by the generating unit from the connecting unit, instead of the converted image, is not performed, the control unit controls so that the second type of image is not read.

(25) The electronic apparatus according to any one of (21) to (24),
further comprising a setting unit configured to set a connection mode with the external apparatus to any of a plurality of connection modes including a first connection mode in which an image having a gradation resolution which is not higher than the first gradation resolution is outputted, and a second connection mode in which an image having a gradation resolution which is higher than the first gradation resolution is outputted,
wherein the control unit controls so that
in a case where the connection is in the first connection mode, the accompanying image recorded in association with the second type of image is outputted from the connecting unit without being converted by the converting unit, and
in a case where the connection is in the second connection mode, the converted image, generated by converting the accompanying image recorded in association with the second type of image using the converting unit, is outputted from the connecting unit, and then an image having the second gradation resolution and generated from the second type of image by the generating unit is outputted from the connecting unit instead of the converted image.

(26) The electronic apparatus according to (25),
wherein in a case where the external apparatus does not support the second connection mode, regarding the second type of image, the control unit controls so that the converted image of the accompanying image is outputted from the connecting unit, and processing to output the image having the second gradation resolution and generated by the generating unit from the connecting unit instead of the converted image is not performed.

(27) The electronic apparatus according to any one of (21) to (26),
wherein the second type of image is a captured image which was captured by an imaging unit.

(28) The electronic apparatus according to any one of (21) to (27).
wherein processing of the generating unit includes developing processing.

(29) The electronic apparatus according to any one of (21) to (28),
wherein the first type of image is a JPEG image.

(30) The electronic apparatus according to any one of (21) to (29),
wherein the second type of image is a RAW image.
(31) The electronic apparatus according to any one of (21) to (30).
wherein the first gradation resolution is 8-bit gradation resolution.
(32) The electronic apparatus according to any one of (21) to (31),
wherein the second gradation resolution is 10-bit or 12-bit resolution gradation.
(33) A control method for an electronic apparatus, comprising:
a converting step of converting a first type of image having a first gradation resolution to a converted image generated by converting a gradation resolution into a second gradation resolution which is higher than the first gradation resolution and converting a gradation characteristic;
a generating step of generating an image having the second gradation resolution, from a second type of image having a gradation resolution which is higher than the first gradation resolution;
a connecting step of connecting with an external apparatus;
a first control step of controlling so that a converted image having the second gradation resolution and generated by converting, in the converting step, an accompanying image, which is an image having the first gradation resolution recorded in association with the second type of image, is outputted to the external apparatus; and
a second control step of controlling so that, after outputting in the first control step, instead of the converted image, an image having the second gradation resolution and generated from the second type of image in the generating step, is outputted to the external apparatus.
(34) A program that causes a computer to function as each unit of the electronic apparatus according to any one of (21) to (32).
(35) A computer readable medium storing a program that causes a computer to function as each unit of the electronic apparatus according to any one of (21) to (32).
(36) An electronic apparatus, comprising:
a connecting unit configured to connect with an external apparatus,
a display unit (display); and
a control unit configured to control so that
when a target image is displayed on the display unit, the target image is displayed with a first gradation resolution, and an information display item on at least one of brightness, gradation and tinge of the target image is also displayed, and
when the target image is outputted from the connecting unit, the target image is outputted at a second gradation resolution, which is higher than the first gradation resolution, without outputting the information display item of the target image.
(37) The electronic apparatus according to (36),
further comprising a converting unit configured to convert a specific type of image having the first gradation resolution into a converted image generated by converting a gradation resolution into a second gradation resolution which is higher than the first gradation resolution, and converting a gradation characteristic,
wherein in a case where the target image is the specific type of image, the control unit controls so that the target image is converted by the converting unit and outputted when the target image is outputted from the connecting unit.
(38) The electronic apparatus according to (37),
wherein the specific type of image is a JPEG image.
(39) The electronic apparatus according to any one of (36) to (38),
wherein the control unit controls so that when the target image is displayed on the display unit with the first gradation resolution, the screen shifts to the predetermined screen, and when the target image is outputted from the connecting unit with the second gradation resolution, the screen does not shift to the predetermined screen.
(40) The electronic apparatus according to (39).
wherein in a case where the screen is controlled not to shift to the predetermined screen, the control unit controls so that a screen including an item which notifies that the shift to the predetermined screen is disabled is outputted from the connecting unit.
(41) The electronic apparatus according to any one of (36) to (40),
further comprising a switching unit configured to switch the screen to any of a plurality of screens, in which volumes of information of the target image are mutually different, each time a user operation is performed using a specific operating member,
wherein the predetermined screen is a screen included in the plurality of screens.
(42) The electronic apparatus according to any one of (36) to (41),
wherein the first gradation resolution is 8-bit gradation resolution.
(43) The electronic apparatus according to any one of (36) to (42),
wherein the second gradation resolution is 10-bit or 12-bit gradation resolution.
(44) The electronic apparatus according to any one of (36) to (43),
further comprising a setting unit configured to set the connection mode with the external apparatus to any of a plurality of connection modes, including a first connection mode in which an image having a gradation resolution which is not higher than the first gradation resolution is outputted, and a second connection mode in which an image having a gradation resolution which is higher than the first gradation resolution is outputted,
wherein the control unit controls so that
in a case where the connection is in the second connection mode, the target image is outputted with the first gradation resolution and a brightness histogram of the target image is outputted on the predetermined screen, when the target image is outputted from the connecting unit, and
in a case where the connection is in the first connection mode, the target image is outputted with the second gradation resolution without outputting the brightness histogram of the target image, when the target image is outputted from the connecting unit.
(45) The electronic apparatus according to any one of (36) to (44),
wherein the information display item is a brightness histogram.
(46) The electronic apparatus according to any one of (36) to (44),
wherein the information display item indicates at least one of exposure correction, white balance setting, setting to correct the white balance setting, setting content of setting items to set sharpness and contrast of an image, a histogram to indicate a distribution of RGB values of the image and setting of a color space of the image.

(47) An electronic apparatus, comprising:
- a connecting unit configured to connect with an external apparatus;
- a setting unit configured to set the connection mode with the external apparatus to any of a plurality of connection modes, including a first connection mode in which an image having a gradation resolution which is not higher than the first gradation resolution is outputted, and a second connection mode in which an image having a gradation resolution which is higher than the first gradation resolution is outputted; and
- a control unit configured to control so that
- in a case where the connection is in the second connection mode, a target image is outputted with the first gradation resolution, and a brightness histogram of the target image is outputted on a predetermined screen, when the target image is outputted from the connecting unit, and
- in a case where the connection is in the first connection mode, the target image is outputted with a second gradation resolution which is higher than the first gradation resolution without outputting the brightness histogram of the target image, when the target image is outputted from the connecting unit.

(48) A control method for an electronic apparatus including a display unit, comprising:
- a connecting step of connecting with an external apparatus; and
- a control step of controlling so that
- when a target image is displayed on the display unit, the target image is displayed with a first gradation resolution, and an information display item on at least one of brightness, gradation and tinge of the target image is also displayed, and
- when the target image is outputted to the external apparatus, the target image is outputted at a second gradation resolution, which is higher than the first gradation resolution, without outputting the information display item of the target image.

(49) A control method for an electronic apparatus, comprising:
- a connecting step of connecting with an external apparatus;
- a setting step of setting the connection mode with the external apparatus to any of a plurality of connection modes, including a first connection mode in which an image having a gradation resolution which is not higher than the first gradation resolution is outputted, and a second connection mode in which an image having a gradation resolution which is higher than the first gradation resolution is outputted; and
- a control step of controlling so that
- in a case where the connection is in the second connection mode, a target image is outputted with the first gradation resolution, and a brightness histogram of the target image is outputted on a predetermined screen, when the target image is outputted to the external apparatus, and
- in a case where the connection is in the first connection mode, the target image is outputted with a second gradation resolution which is higher than the first gradation resolution without outputting the brightness histogram of the target image, when the target image is outputted to the external apparatus.

(50) A program that causes a computer to function as each unit of the electronic apparatus according to any one of (36) to (47).

(51) A computer readable medium storing a program that causes a computer to function as each unit of the electronic apparatus according to any one of (36) to (47).

(52) An electronic apparatus, comprising:
- a connecting unit configured to connect with an external apparatus;
- a setting unit configured to set a connection mode with the external apparatus to any of a plurality of connection modes, including a first connection mode and a second connection mode; and
- a control unit configured to control so that
- in a case where the connection in the second connection mode and an instruction to reproduce a specific type of moving image is received, the set connection mode is switched from the second connection mode to the first connection mode, a stopped image of the moving image is outputted from the connecting unit, and progressing images of the moving image are automatically outputted from the connecting unit after a predetermined time elapses from the output of the stopped image.

(53) The electronic apparatus according to (52),
wherein the first connection mode is a connection mode in which an image having a first gradation resolution is outputted, and
the second connection mode is a connection mode in which an image having a second gradation resolution which is higher than the first gradation resolution is outputted.

(54) The electronic apparatus according to (53),
wherein the first gradation resolution is 8-bit gradation resolution.

(55) The electronic apparatus according to (53) or (54),
wherein the second gradation resolution is 10-bit or 12-bit gradation resolution.

(56) The electronic apparatus according to any one of (52) to (55),
wherein the specific type of moving image is a moving image having a first gradation resolution.

(57) The electronic apparatus according to (52),
wherein the first connection mode is a connection mode in which an image having a first resolution is outputted,
the second connection mode is a connection mode in which an image having a second resolution which is different from the first resolution is outputted, and
the specific type of moving image is a moving image having the first resolution.

(58) The electronic apparatus according to (52),
wherein the first connection mode is a connection mode in which an image having a first frame rate is outputted,
the second connection mode is a connection mode in which an image having a second frame rate which is different from the first frame rate is outputted, and
the specific type of moving image is a moving image having the first frame rate.

(59) The electronic apparatus according to any one of (52) to (58).
wherein the stopped image includes an item to notify that the progressing images are automatically outputted after the predetermined time elapses.

(60) The electronic apparatus according to any one of (52) to (59),
wherein the control unit controls so that in a case where a predetermined user operation is performed before the predetermined time elapses, the progressing images are outputted from the connecting unit even if the predetermined time has not yet elapsed.

(61) The electronic apparatus according to any one of (52) to (60),
wherein the stopped image does not include a display item to instruct the start of reproduction.

(62) The electronic apparatus according to any one of (52) to (61),
wherein the predetermined time is at least 0.3 seconds.

(63) The electronic apparatus according to any one of (52) to (62),
further comprising a processing unit configured to perform a slide show in which a plurality of images are automatically switched one by one at a predetermined switching interval, and each image is outputted to the external apparatus,
wherein the predetermined time is a time that is independently set regardless the switching interval.

(64) A control method for an electronic apparatus, comprising:
a connecting step of connecting with an external apparatus;
a setting step of setting a connection mode with the external apparatus to any of a plurality of connection modes, including a first connection mode and a second connection mode; and
a control step of controlling so that
in a case where the connection in the second connection mode and an instruction to reproduce a specific type of moving image is received, the set connection mode is switched from the second connection mode to the first connection mode, a stopped image of the moving image is outputted to the external apparatus, and progressing images of the moving image are automatically outputted to the external apparatus after a predetermined time elapses from the output of the stopped image.

(65) A program that causes a computer to function as each unit of the electronic apparatus according to any one of (52) to (63).

(66) A computer readable medium storing a program that causes a computer to function as each unit of the electronic apparatus according to any one of (52) to (63).

(67) An electronic apparatus, comprising:
a converting unit configured to convert a first type of image having a first gradation resolution into a converted image generated by converting a gradation resolution to a second gradation resolution which is higher than the first gradation resolution, and converting a gradation characteristic;
a connecting unit configured to connect with an external apparatus;
a setting unit configured to set a connection mode with the external apparatus to any of a plurality of connection modes, including a first connection mode in which an image having a gradation resolution which is not higher than the first gradation resolution is outputted, and a second connection mode in which an image having a gradation resolution which is higher than the first gradation resolution is outputted; and
a control unit configured to control so that
in a case where the connection is in the first connection mode, the first type of image is outputted from the connecting unit without converting the first type of image by the converting unit, and
in a case where the connection is in the second connection mode, the first type of image is converted by the converting unit, and is outputted from the connecting unit.

(68) The electronic apparatus according to (67), wherein regarding a second type of image having a gradation resolution which is higher than the first gradation resolution, the control unit controls so that in a case where the connection is in the second connection mode, an image based on the second type of image is outputted from the connecting unit, without converting the second type of image by the converting unit.

(69) The electronic apparatus according to (67) or (68),
wherein regarding a second type of image having a gradation resolution which is higher than the first gradation resolution, the control unit controls so that
in a case where the connection is in the first connection mode, an image having the first gradation resolution which is recorded in association with the second type of image is outputted from the connecting unit, and
in a case where the connection is in the second mode, an image having the second gradation resolution is generated from the second type of image, and is outputted from the connecting unit.

(70) The electronic apparatus according to (68) or (69), wherein source of the image to be outputted from the connecting unit can be switched from the second type of image to the first type of image, while maintaining the connection in the second connection mode.

(71) The electronic apparatus according to any one of (68) to (70), wherein the second type of image is an image before developing processing is performed.

(72) The electronic apparatus according to any one of (67) to (71), wherein the first type of image is a JPEG image.

(73) The electronic apparatus according to any one of (67) to (72), wherein the reconnection processing with the external apparatus is performed in a case where the set connection mode is switched from the second connection mode to the first connection mode.

(74) The electronic apparatus according to (73), wherein the reconnection processing is processing for an HDMI (registered trademark) connection.

(75) The electronic apparatus according to any one of (67) to (74), wherein processing by the converting unit includes processing to convert a color space of an image.

(76) The electronic apparatus according to (75),
wherein the converting unit sequentially performs:
processing to convert the color space of the image into a first color space;
processing to convert a gradation characteristic of the image into a first gradation characteristic;
processing to convert a gradation resolution of the image from the first gradation resolution into the second gradation resolution;
processing to convert the gradation characteristic of the image into a second gradation characteristic; and
processing to convert the color space of the image into a second space.

(77) The electronic apparatus according to any one of (67) to (76), wherein the converting unit converts an image with color space (gradation characteristic, gradation resolution) =YCC (gradation characteristic specified in BT. 601, gradation resolution specified in BT. 601) into an image with YCC (gradation characteristic specified in ST. 2084, gradation resolution specified in BT. 2020).

(78) The electronic apparatus according to (77), wherein the converting unit sequentially performs:

processing to convert an image with color space (gradation characteristic, gradation resolution)=YCC (gradation characteristic specified in BT. 601, gradation resolution specified in BT. 601) into an image with RGB (gradation characteristic specified in BT. 601, gradation resolution specified in BT. 601);

processing to convert an image with RGB (gradation characteristic specified in BT. 601, gradation resolution specified in BT. 601) into an image with RGB (linear characteristic, gradation resolution specified in BT. 601);

processing to convert an image with RGB (linear characteristic, gradation resolution specified in BT. 601) into an image with RGB (linear characteristic, gradation characteristic specified in BT. 2020);

processing to convert an image with RGB (linear characteristic, gradation resolution specified in BT. 2020) into an image with RGB (gradation characteristic specified in ST. 2084, gradation resolution specified in BT. 2020); and processing to convert an image with RGB (gradation characteristic specified in ST. 2084, gradation resolution specified in BT. 2020) into an image with YCC (gradation characteristic specified in ST. 2084, gradation resolution specified in BT. 2020).

(79) The electronic apparatus according to any one of (67) to (78), wherein the first gradation resolution is 8-bit gradation resolution.

(80) The electronic apparatus according to any one of (67) to (79), wherein the second gradation resolution is 10-bit or 12-bit gradation resolution.

(81) A control method for an electronic apparatus, comprising:

a converting step of converting a first type of image having a first gradation resolution into a converted image generated by converting a gradation resolution to a second gradation resolution which is higher than the first gradation resolution, and converting a gradation characteristic;

a setting step of setting a connection mode with an external apparatus to any of a plurality of connection modes, including a first connection mode in which an image having a gradation resolution which is not higher than the first gradation resolution is outputted, and a second connection mode in which an image having a gradation resolution which is higher than the first gradation resolution is outputted; and a control step of controlling so that in a case where the connection is in the first connection mode, the first type of image is outputted to the external apparatus without converting the first type of image in the converting step, and in a case where the connection is in the second connection mode, the first type of image is converted in the converting step, and is outputted to the external apparatus.

(82) A program that causes a computer to function as each unit of the electronic apparatus according to any one of (67) to (80).

(83) A computer readable medium storing a program that causes a computer to function as each unit of the electronic apparatus according to any one of (67) to (80).

In each embodiment described above, the processing in the case where the output I/F 91 is connected to the external apparatus 300 in the HDR connection mode, and the processing m the case where the output IiF 91 is connected to the external apparatus 300 in the SDR connection mode were described. But, the present invention is not limit to this, and the present invention can be applied to processing in a case where an image is output to various display devices that can receive images from the digital camera 100*t*. For example, the present invention can be applied to processing in a case where an image is outputted to the external EVF (Electronic View Finder) unit which is regarded as the external apparatus 300. Furthermore, devices to which images are output are not limited to external apparatuses, and the present invention can be applied to image output processing to a back monitor (the display unit 28) of the digital camera 100*t* (various electronic apparatuses not limited to the imaging apparatus) or a built-in EVF in a case where the display unit 28 or the built-in EVF supports HDR image signals (the display unit 28 or the built-in EVF is capable of performing the HDR display). As an example, it is assumed that the display unit 28 is capable of performing the HDR display, and an HDR display mode or an SDR display mode can be selected and set as a display mode for the display unit 28. In this case, as processing in the HDR display mode, it is possible to perform the same processing as the HDR connection mode in each embodiment described above. As processing in the SDR display mode, it is possible to perform the same processing as the SDR connection mode in each embodiment described above According to these processing, for example, the following electronic apparatuses are disclosed.

An electronic apparatus, comprising:

a converting unit configured to convert a first type of image having a first gradation resolution into a converted image generated by converting a gradation resolution to a second gradation resolution which is higher than the first gradation resolution, and converting a gradation characteristic;

an output unit configured to output an image signal to a display unit;

a setting unit configured to set a display mode for the display unit to any of a plurality of display modes, including a first display mode in which an image having a gradation resolution which is not higher than the first gradation resolution is displayed, and a second display mode in which an image having a gradation resolution which is higher than the first gradation resolution is displayed; and a control unit configured to control so that in a case where the displaying is in the first display mode, the first type of image is outputted to the display unit without converting the first type of image by the converting unit, and in a case where the displaying is in the second display mode, the first type of image is converted by the converting unit, and is outputted to the display unit.

And, source of the image to be outputted from the output unit can be switched from a second type of image (for example, a RAW image) to the first type of image (for example, a JPEG image), while maintaining the setting of the second display mode (an HDR display mode).

Furthermore, the following electronic apparatuses are disclosed.

An electronic apparatus, comprising:

a converting unit configured to convert a first type of image having a first gradation resolution to a converted image generated by converting a gradation resolution into a second gradation resolution which is higher than the first gradation resolution and converting a gradation characteristic;

a generating unit configured to generate an image having the second gradation resolution, from a second type of image having a gradation resolution which is higher than the first gradation resolution;
an output unit configured to output an image signal to a display unit;
a control unit configured to control so that, in a case where the second type of image is outputted, a converted image having the second gradation resolution and generated by converting, by the converting unit, an accompanying image, which is an image having the first gradation resolution recorded in association with the second type of image, is outputted from the output unit, and then, instead of the converted image, an image having the second gradation resolution and generated from the second type of image by the generating unit, is outputted from the output unit.

An electronic apparatus, comprising:
an output unit configured to output an image signal to a display unit;
a setting unit configured to set a display mode for the display unit to any of a plurality of display modes, including a first display mode in which an image having a gradation resolution which is not higher than a first gradation resolution is displayed, and a second display mode in which an image having a gradation resolution which is higher than the first gradation resolution is displayed; and
a control unit configured to control so that in a case where the displaying is in the second display mode and an instruction to switch a first screen including a captured image captured by an imaging unit to a second screen not including a captured image is received, the set display mode is switched from the second display mode to the first display mode, and the second screen is outputted from the output unit.

This application claims the benefit of Japanese Patent Application No. 2017-252110, filed on Dec. 27, 2017, Japanese Patent Application No. 2017-251132, filed on Dec. 27, 2017, Japanese Patent Application No. 2017-251259, filed on Dec. 27, 2017, Japanese Patent Application No. 2017-251161, filed on Dec. 27, 2017, Japanese Patent Application No. 2017-251115, filed on Dec. 27, 2017, and Japanese Patent Application No. 2018-212167, filed on Nov. 12, 2018, which are hereby incorporated by reference herein in their entirety.

What is claimed is:

1. An electronic apparatus comprising:
a connector configured to connect with an external apparatus;
a memory; and
at least one processor and/or at least one circuit to perform the operations of the following units:
a setting unit configured to set a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;
a converting unit configured to convert a specific type of image having the first gradation resolution into a converted image generated by converting a gradation resolution to a second gradation resolution which is higher than the first gradation resolution, in a case where the connection is in the second connection mode; and
a control unit configured to control so that in a case where the connection is in the second connection mode and an instruction to switch a first screen including a captured image captured by an image sensor to a second screen not including a captured image is received, the set connection mode is automatically switched from the second connection mode to the first connection mode, and the second screen is outputted from the connector.

2. The electronic apparatus according to claim 1,
wherein in a case where an instruction to switch the second screen, which was outputted by switching the set connection mode from the second connection mode to the first connection mode, to the first screen is received, the control unit controls so that the set connection mode is switched from the first connection mode to the second connection mode and the first screen is outputted from the connector.

3. The electronic apparatus according to claim 1,
wherein the second screen is a menu screen including a plurality of menu items, and
in a case where an instruction to select a specific menu item on the second screen, which was outputted by switching the set connection mode from the second connection mode to the first connection mode is received, the control unit controls so that a screen, which relates to the specific menu item and includes the captured image, is outputted from the connector without changing the set connection mode from the first connection mode.

4. The electronic apparatus according to claim 1, wherein
the converting unit converts the specific type of image into the converted image generated by converting the gradation resolution to the second gradation resolution and converting a gradation characteristic, and
in a case where the connection is in the second connection mode, the control unit controls so that the specific type of image is converted by the converting unit and outputted when the first screen including the specific type of image is outputted from the connector.

5. The electronic apparatus according to claim 4,
wherein the specific type of image is a JPEG image.

6. The electronic apparatus according to claim 4,
wherein the second gradation resolution is 10-bit or 12-bit gradation resolution.

7. The electronic apparatus according to claim 1,
wherein the first gradation resolution is 8-bit gradation resolution.

8. The electronic apparatus according to claim 1,
wherein in a case where the set connection mode is switched from the second connection mode to the first connection mode, the control unit controls so that a screen including an item to notify that the set connection mode is switched is outputted from the connector.

9. An electronic apparatus comprising:
a connector configured to connect with an external apparatus;
a memory; and
at least one processor and/or at least one circuit to perform the operations of the following units:
a setting unit configured to set a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;

a converting unit configured to convert a specific type of image having the first gradation resolution into a converted image generated by converting a gradation resolution to a second gradation resolution which is higher than the first gradation resolution, in a case where the connection is in the second connection mode; and a control unit configured to control so that in a case where the connection s in the second connection mode and an instruction to switch a first screen including a reproduced image to a third screen to perform imaging is received, the set connection mode is automatically switched from the second connection mode to the first connection mode and the third screen is outputted from the connector.

10. The electronic apparatus according to claim 9, wherein the third screen is a screen including a live-view image captured by an image sensor.

11. The electronic apparatus according to claim 9, wherein the third screen is a screen on which imaging setting information on imaging by the image sensor is displayed.

12. The electronic apparatus according to claim 9, wherein the control unit controls so that the imaging is performed in a case where an imaging instruction is received in a state where the set connection mode is switched from the second connection mode to the first connection mode and the third screen is being outputted from the connector, and the first connection mode is continued in a case where the screen is automatically switched to a fourth screen which is a screen to confirm a captured image acquired by this imaging and includes a reproduced image.

13. The electronic apparatus according to claim 12, wherein the fourth screen is a screen to confirm the captured image acquired by a previous imaging.

14. The electronic apparatus according to claim 13, wherein the fourth screen is a quick review screen.

15. The electronic apparatus according to claim 9, wherein in a case where a user operation to switch the screen to the first screen is received in a state where the set connection mode is switched from the second connection mode to the first connection mode, the control unit controls so that the set connection mode is returned to the second connection mode when the screen is switched to the first screen.

16. The electronic apparatus according to claim 9, wherein the first screen is a reproduction screen in a reproduction mode, and the third screen is an imaging standby screen in an imaging mode.

17. A control method for an electronic apparatus, comprising:

a connecting step of connecting with an external apparatus;

a setting step of setting a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;

converting a specific type of image having the first gradation resolution into a converted image generated by converting a gradation resolution to a second gradation resolution which is higher than the first gradation resolution, in a case where the connection is in the second connection mode; and a control step of controlling so that in a case where the connection is in the second connection mode and an instruction to switch a first screen including a reproduced image to a third screen to perform imaging is received, the set connection mode is automatically switched from the second connection mode to the first connection mode, and the third screen is outputted to the external apparatus.

18. A control method for an electronic apparatus, comprising:

a connecting step of connecting with an external apparatus;

a setting step of setting a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;

converting a specific type of image having the first gradation resolution into a converted image generated by converting a gradation resolution to a second gradation resolution which is higher than the first gradation resolution, in a case where the connection is in the second connection mode; and a control step of controlling so that in a case where the connection is in the second connection mode and an instruction to switch a first screen including a reproduced image to a third screen to perform imaging is received, the set connection mode is automatically switched from the second connection mode to the first connection mode and the third screen is outputted to the external apparatus.

19. A non-transitory computer readable medium that stores a program, wherein the program causes a computer to execute:

a connecting step of connecting with an external apparatus;

a setting step of setting a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;

converting a specific type of image having the first gradation resolution into a converted image generated by converting a gradation resolution to a second gradation resolution which is higher than the first gradation resolution, in a case where the connection is in the second connection mode; and a control step of controlling so that in a case where the connection is in the second connection mode and an instruction to switch a first screen including a captured image captured by an image sensor to a second screen not including a captured image is received, the set connection mode is automatically switched from the second connection mode to the first connection mode, and the second screen is outputted to the external apparatus.

20. A non-transitory computer readable medium that stores a program, wherein the program causes a computer to execute:
- a connecting step of connecting with an external apparatus;
- a setting step of setting a connection mode with the external apparatus to any of a plurality of connection modes, including a first connection mode in which an image having a gradation resolution which is not higher than a first gradation resolution is outputted, and a second connection mode in which an image having a gradation resolution which is higher than the first gradation resolution is outputted;
- converting a specific type of image having the first gradation resolution into a converted image generated by converting a gradation resolution to a second gradation resolution which is higher than the first gradation resolution, in a case where the connection is in the second connection mode; and
- a control step of controlling so that in a case where the connection is in the second connection mode and an instruction to switch a first screen including a reproduced image to a third screen to perform imaging is received, the set connection mode is automatically switched from the second connection mode to the first connection mode and the third screen is outputted to the external apparatus.

* * * * *